US011535267B2

(12) United States Patent
Meng

(10) Patent No.: US 11,535,267 B2
(45) Date of Patent: Dec. 27, 2022

(54) USER ALERT SYSTEMS, APPARATUS, AND RELATED METHODS FOR USE WITH VEHICLES

(71) Applicant: Toyota Motor Engineering & Manufacturing North America, INC., Plano, TX (US)

(72) Inventor: Ming Michael Meng, Novi, MI (US)

(73) Assignee: Toyota Motor Engineering & Manufacturing North America, INC., Plano, TX (US)

( * ) Notice: Subject to any disclaimer, the term of this patent is extended or adjusted under 35 U.S.C. 154(b) by 345 days.

(21) Appl. No.: 16/822,912

(22) Filed: Mar. 18, 2020

(65) Prior Publication Data

US 2021/0291849 A1 Sep. 23, 2021

(51) Int. Cl.
*B60W 50/04* (2006.01)
*H04L 9/40* (2022.01)
*B60W 50/14* (2020.01)
*B60W 50/029* (2012.01)
*B60W 50/02* (2012.01)

(52) U.S. Cl.
CPC ...... *B60W 50/045* (2013.01); *B60W 50/0205* (2013.01); *B60W 50/029* (2013.01); *B60W 50/14* (2013.01); *H04L 63/1416* (2013.01)

(58) Field of Classification Search
CPC ........... B60W 50/045; B60W 50/0205; B60W 50/029; B60W 50/14; H04L 63/1416
USPC ......................................................... 726/24
See application file for complete search history.

(56) References Cited

U.S. PATENT DOCUMENTS

| 9,173,100 | B2 | 10/2015 | Ricci |
| 9,813,436 | B2 | 11/2017 | Moeller et al. |
| 10,009,325 | B1* | 6/2018 | David ...................... H04L 9/08 |
| 10,017,155 | B1 | 7/2018 | Allouche et al. |
| 2015/0172306 | A1 | 6/2015 | Kim et al. |
| 2018/0040172 | A1* | 2/2018 | Funk ...................... G06F 21/566 |
| 2018/0234446 | A1 | 8/2018 | Conner et al. |
| 2019/0171813 | A1 | 6/2019 | Oberman |
| 2019/0253439 | A1 | 8/2019 | Payton |
| 2020/0387605 | A1* | 12/2020 | Gilad .................... G06F 21/566 |

FOREIGN PATENT DOCUMENTS

CN 105438122 A 3/2016

\* cited by examiner

*Primary Examiner* — Isaac G Smith
(74) *Attorney, Agent, or Firm* — Oblon, McClelland, Maier & Neustadt, L.L.P.

(57) ABSTRACT

User alert systems, apparatus, and related methods for use with vehicles are disclosed. A disclosed alert system for a vehicle includes an intrusion detection system (IDS) operatively coupled to the vehicle. The alert system also includes a network access device (NAD) operatively coupled to the vehicle and control circuitry configured to detect, via the IDS, a malicious message transmitted through a controller area network (CAN) bus of the vehicle. The control circuitry is also configured to generate a primary alert indicative of the malicious message and transmit, via the NAD, the primary alert to a primary user device corresponding to a driver of the vehicle. The control circuitry is also configured to generate a secondary alert indicative of the malicious message and transmit, via the NAD, the secondary alert to one or more secondary user devices different from the primary user device.

16 Claims, 8 Drawing Sheets

USER ALERT SYSTEMS, APPARATUS, AND RELATED METHODS FOR USE WITH VEHICLES

FIELD OF THE DISCLOSURE

This disclosure relates generally to vehicles and, more particularly, to user alert systems, apparatus, and related methods for use with vehicles.

BACKGROUND

Vehicles typically employ controller area network (CAN) protocols to facilitate communications between different vehicle electronic devices and/or vehicle systems. A single a pair of wires is typically routed through a vehicle to form a vehicle CAN bus through which data can be transmitted during vehicle operation.

SUMMARY

An aspect of the present disclosure includes a user alert system for a vehicle. The user alert system includes an intrusion detection system (IDS) operatively coupled to the vehicle. The user alert system also includes a network access device (NAD) operatively coupled to the vehicle and control circuitry configured to detect, via the IDS, a malicious message transmitted through a CAN bus of the vehicle. The control circuitry is also configured to generate a primary alert indicative of the malicious message and transmit, via the NAD, the primary alert to a primary user device corresponding to a driver of the vehicle. The control circuitry is also configured to generate a secondary alert indicative of the malicious message and transmit, via the NAD, the secondary alert to one or more secondary user devices different from the primary user device.

Another aspect of the present disclosure includes a vehicle. The vehicle includes a CAN bus, an IDS connected to the CAN bus, an NAD connected to the CAN bus, and control circuitry configured to detect, via the IDS, a malicious message transmitted through the CAN bus. The control circuitry is also configured to generate an alert indicative of the malicious message and transmit, via the NAD, the alert to a primary user device corresponding to a first person associated with the vehicle. The alert includes an instruction to the first person to minimize potential risks to an occupant of the vehicle.

Another aspect of the present disclosure includes a tangible machine-readable storage medium having instructions that, when executed, cause a processor to at least detect, via an IDS of a vehicle, a malicious message transmitted through a CAN bus of the vehicle. The instructions also cause the processor to generate, via a controller of the vehicle, a user alert indicative of the malicious message and transmit, via the NAD, the user alert to a set of user devices corresponding to a driver of the vehicle and a person different from the driver.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
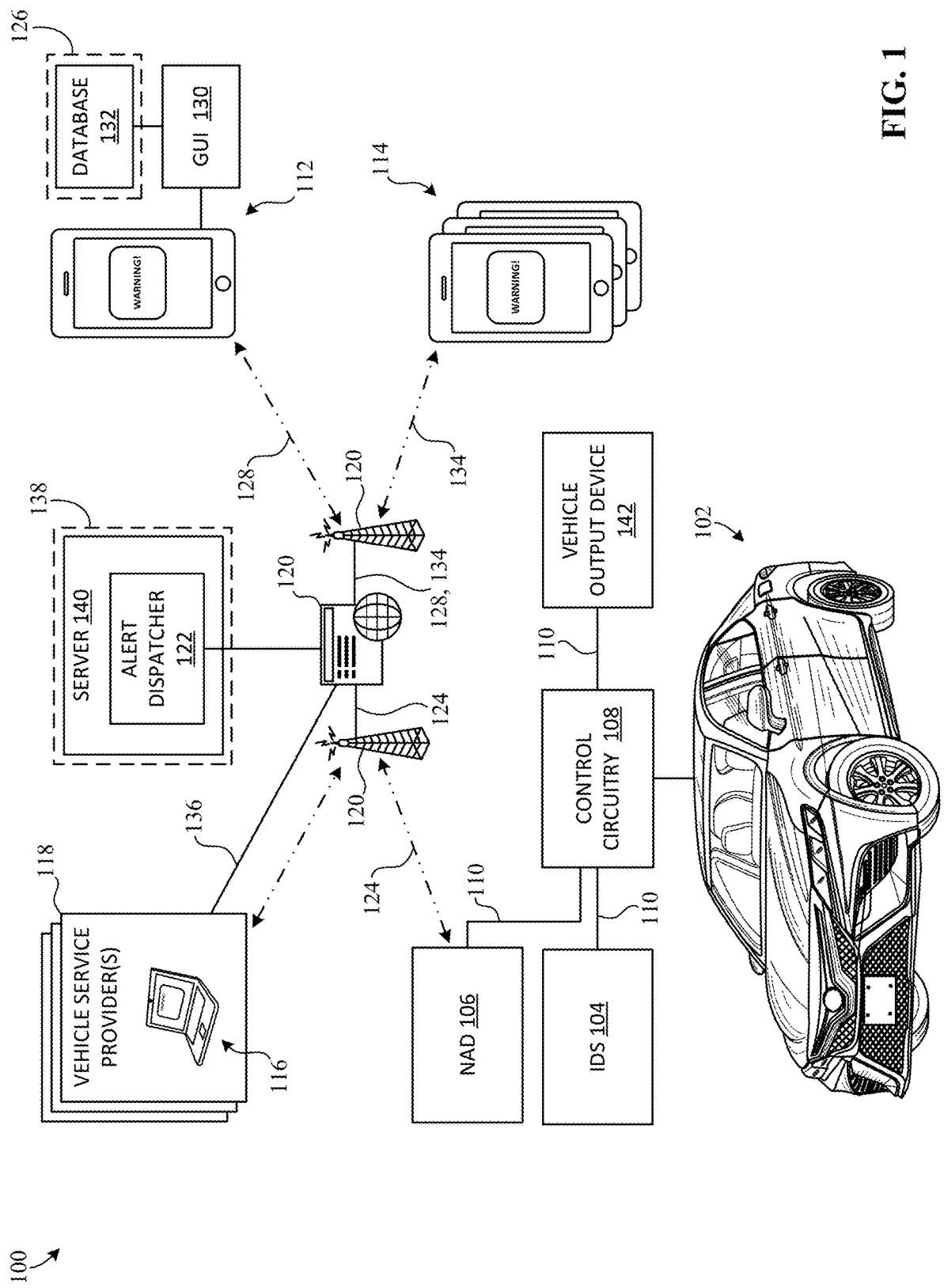
FIG. 1 illustrates a schematic diagram of an example system including an example vehicle and example user devices for interacting with a cloud-based alert application in accordance with the teachings of this disclosure.

Vehicle networks, such as CANs, may have vulnerabilities within in-vehicle communication protocol, which can be exploited by one or more users (e.g., hackers) who are not authorized to use and/or access the vehicle networks. Such an unauthorized user may be able remotely access a vehicle (e.g., a connected vehicle) though a wide-range of vehicle systems and/or devices such as, for example, any of a telematics device, a telecommunication module, a navigation device or global position system (GPS), a radio, etc., and/or any other vehicle electronic device(s) that may communicate with wireless and/or web-based communication networks external to the vehicle. Once the unauthorized user obtains access to a network or CAN of the vehicle (i.e., a network intrusion has occurred), the unauthorized user can control or imitate one or more of the vehicle systems and/or devices, for example, to broadcast malicious messages over the CAN that are associated with disrupting and/or interfering with operations of the vehicle. Such malicious messages broadcasted over the CAN pose substantial risks to vehicle occupant(s) when the vehicle is driving. For example, a malicious message, when received by a steering system via a CAN bus of the vehicle, may disable steering functionality of the vehicle.

Accordingly, to protect such a vehicle network from an intrusion and/or an attack by an unauthorized user, vehicles typically employ known electronic security systems. For example, to mitigate unauthorized access to the vehicle network, a vehicle may include a network firewall that monitors and controls incoming and/or outgoing network traffic based on predefined security rules. Additionally, the vehicle may include or employ other known security systems and/or measures such as key management systems, antimalware software or programs, etc. As such, a malicious message may pass through numerous gates before reaching a CAN bus of the vehicle. Such known vehicle security systems may also be capable of detecting when the vehicle network is under attack and/or has been accessed by an unauthorized user and, in response, route related information to a server. However, these known vehicle security systems may leave one or more occupants (e.g., including the driver) of the vehicle unaware of such an unsafe condition of the vehicle, which puts the occupant(s) at substantial risk due to potential vehicle system failure that can be caused by a malicious message transmitted through the CAN bus.

User alert systems, apparatus, and related methods for use with vehicles are disclosed. Disclosed examples provide an effective, low cost solution for alerting one or more persons (e.g., any of a driver, one or more vehicle occupants, family of the driver, friends of the driver, personnel of a vehicle service provider, etc.) associated with a vehicle when the vehicle or any part thereof has been compromised and/or hacked (e.g., by an unauthorized user accessing a network of the vehicle). As will be discussed in greater detail below in connection with FIGS. 1-8, example systems, apparatus, and methods disclosed herein automatically detect a certain vehicle network event (e.g., an intrusion of a vehicle CAN bus) of the vehicle and, in response to the detection, communicate with one or more user devices (e.g., mobile electronic devices such as smartphones or cell phones, tablets, laptops, etc.) in real-time to notify the person(s) that the vehicle network event has been detected. Some disclosed examples transmit, via an NAD of the vehicle, a primary alert to a first or primary user device (e.g., a mobile electronic device belonging to a driver of the vehicle) corresponding to a first person (e.g., the driver) associated with the vehicle. In such examples, the primary user device is configured to notify the first person regarding the detecting vehicle network event, for example, by generating and/or displaying one or more messages based on the primary alert, by generating one or more sounds based on the primary alert, etc., as discussed further below in connection with FIG. 3. Additionally, in some examples, the primary alert includes one or more instructions (e.g., encoded and/or embedded therein) to the first person to minimize potential risks to an occupant of the vehicle, which can be presented to the first person by the primary user device. In particular, the first person or a user of the primary user device can respond appropriately to the primary alert after receiving the primary alert, for example, by turning off the vehicle and/or taking the vehicle to a vehicle service provider for inspection.

Additionally, some disclosed examples transmit, via the NAD, a secondary alert to one or more secondary user devices (e.g., one or more mobile electronic devices belonging to any of family of the first person, friend(s) of the first person, etc.) different from the primary user device. Such a secondary alert facilitates notifying the first person regarding the vehicle network event, for example, if the first person is not responsive to primary alert. For example, if an adolescent is driving the vehicle, such a secondary alert could be sent to one or more family members (e.g., parents, siblings, etc.) of the adolescent. In another example, if a married person is driving the vehicle, the alert could also be sent to a spouse of the married person. In such examples, the secondary user device(s) correspond to one or more persons other or different than the first person, for example, who may be related to the first person and/or who may typically service or maintain the vehicle. Additionally or alternatively, one or more of the secondary user device(s) can correspond to one or more organizations or vehicle service providers associated with the vehicle such as, for example, OnStar® and the like. In any case, the second user device(s) is/are configured to notify the user(s) thereof regarding the detected vehicle network event, for example, by generating and/or displaying one or more messages based on the secondary alert, by generating one or more sounds based on the secondary alert, etc., as discussed further below in connection with FIG. 4. Further, in some such examples, the secondary alert includes one or more instructions (e.g., encoded and/or embedded therein) to the user(s) of the secondary user device(s) to (a) contact the first person and/or (b) minimize potential risks to an occupant of the vehicle, which can be presented to the user(s) by the secondary user device(s). In particular, a user of the secondary device(s) can respond appropriately to the secondary alert after receiving the secondary alert, for example, by contacting the first person and/or instructing the first person to take the vehicle to a vehicle service provider for inspection.

Some disclosed examples dispatch the primary and secondary alerts simultaneously to the primary user device and one or more (e.g., all) of the secondary user device(s), which may be effective in rapidly alerting the first person upon detection of the vehicle network event. On the other hand, some disclosed examples can first dispatch the primary alert to the primary user device and then wait (e.g., for a relatively short predefined time interval) to receive a response from the primary user device before dispatching the secondary alert to the secondary user device(s). In some examples, the primary alert is different relative to the secondary alert. For example, the secondary alert can include certain information (e.g., identifying and/or sensitive information of the first person such as a name of the first person and a cell phone number of the first person) which the primary alert does not include. Alternatively, the primary alert and the secondary alert can be the same alert, for example, including substantially the same information.

In this manner, disclosed examples avoid potential risks to the driver and/or the occupant(s) of the vehicle when CAN bus intrusion occurs by providing one or more prompt warning or alerts to the user device(s) in real-time. As a result, the user(s) of the user device(s) can be informed of key threats associated with the vehicle as the threats are detected, which would have otherwise been unattainable using the above-mentioned known vehicle security systems. Thus, disclosed examples improve vehicle safety by ensuring the driver does not operate or continue to operate the vehicle in such an unsafe condition.

FIG. 1 illustrates a schematic diagram of an example system (e.g., a user alert system) 100 in which examples disclosed herein can be implemented. According to the illustrated example of FIG. 1, the system 100 includes an example vehicle 102 such as, for example, one of a car, a truck, a van, a sport utility vehicle (SUV), etc. The system 100 also includes an example IDS 104 of the vehicle 102, an example NAD 106 of the vehicle 102, and example control circuitry 108. That is, the vehicle 102 of FIG. 1 can be implemented using and/or otherwise include the IDS 104 and the NAD 106. The vehicle 102 of FIG. 1 also includes an example bus (e.g., a serial communication bus such as a CAN bus) 110, which enables effective communications and/or interactions between different electronic components of the vehicle 102. For example, the bus 110 electrically interconnects the IDS 104, the NAD 106, and the control circuitry 108. Further, the vehicle 102 of FIG. 1 may also include one or more appropriate vehicle electronic devices and/or vehicle systems that may communicate via the bus 110 such as, for example, a telematics system (e.g., an OnStar® device), an infotainment system, a GPS, a navigation system, a vehicle-to-vehicle (V2V) communication system, a vehicle-to-infrastructure (V2I) communication system, etc., and/or any other suitable vehicle device(s) and/or vehicle system(s). As such, the vehicle 102 of FIG. 1 is sometimes referred to as a connected vehicle and/or a connected car.

In particular, the control circuitry 108 of FIG. 1 is configured to detect, via the IDS 104, a malicious message (e.g., a data packet such as a CAN packet associated with disabling a system or component of the vehicle 102) transmitted through the bus 110 of the vehicle 102, which will be discussed in greater detail below in connection with FIGS. 2-8. In response to such detection, the control circuitry 108 is also configured to the generate a primary alert indicative of the malicious message and transmit, via the NAD 106, the primary alert to a first or primary user device (e.g., a mobile device such as a smartphone or cell phone, a tablet, a laptop, etc.) 112 corresponding to a first person (e.g., any of a driver, a vehicle owner, a vehicle occupant, etc.) associated with the vehicle 102. Such a primary alert serves to notify and/or warn the first person that a certain condition (e.g., a compromised and/or hacked condition) of the vehicle 102 has been detected in which the vehicle 102 may be compromised and/or hacked. Further, the primary alert can serve to instruct the first person how to minimize potential risks to any occupant(s) of the vehicle 102 or otherwise resolve the condition of the vehicle 102. Additionally or alternatively, in some examples (e.g., if the first person does not notice or respond to the primary alert), the control circuitry 108 is configured to generate a secondary alert indicative of the malicious message and transmit, via the NAD 106, the secondary alert to (a) one or more second user devices 114 different from the primary user device 112 and/or (b) one or more third user device(s) 116 different from the primary user device 112. The second user device(s) 114 and/or the third user device(s) 116 is/are sometimes referred to as one or more secondary user devices 114, 116, each of which is different from the primary user device 112. In such examples, at least one of the second user device(s) 114 corresponds to a second person (e.g., a family member or a friend of the first person) associated with the vehicle 102 different from the first person, and at least one of the third user device(s) 116 corresponds to an example vehicle service provider 118 associated with the vehicle 102, as discussed further below. Such a secondary alert may facilitate warning and/or instructing the first person, for example, if the first person is not responsive to the primary alert. Each of the primary alert and the second alert provided by the control circuitry 108 is sometimes referred to as an alert and/or a user alert.

The IDS 104 of FIG. 1 can be implemented, for example, using a network-based intrusion detection system and/or a host-based intrusion detection system. In some examples, the IDS 104 includes any of a Network Intrusion Detection System (NIDS), a Network Node Intrusion Detection System (NNIDS), a Host Intrusion Detection System (HIDS), etc., or a combination thereof. Further, the IDS 104 can function cooperatively with a key management system of the vehicle 102, a network firewall of the vehicle 102, etc., any other suitable vehicle security system(s), or a combination thereof. The IDS 104 of FIG. 1 is operatively coupled to the vehicle 102 and/or the control circuitry 108, for example, via the bus 110. For example, the IDS 104 is connected (e.g., electrically) to the bus 110. In particular, the IDS 104 of FIG. 1 is configured to analyze messages (e.g., data packets such as CAN packets) transmitted through the bus 110 to determine whether any one of the messages is likely malicious, which serves as a trigger for the control circuitry 108. The IDS 104 can continuously and/or repeatedly (e.g., any of periodically, a-periodically, etc.) analyze the messages to detect one or more malicious messages, for example, prior to and/or during operation of the vehicle 102. In other words, the IDS 104 can monitor the bus 110. In response to detecting a certain vehicle network event (e.g., an intrusion of a vehicle CAN bus) based on analyzing the messages, the IDS 104 is configured to communicate or relay such detection to the control circuitry 108, thereby enabling the control circuitry 108 to initiate an example alert process of the vehicle 102. The IDS 104 of FIG. 1 can advantageously utilize one or more algorithms, one or more methods, and/or one or more techniques associated with detecting an intrusion and/or an attempted intrusion of the vehicle 102 or the bus 110 thereof, which can include signature-based IDS approaches and anomaly-based IDS approaches.

In the example of FIG. 1, the NAD 106 of FIG. 1, which is sometimes referred to as a data communication module (DCM), facilitates connecting the control circuitry 108 to one or more example external networks (e.g., one or more wireless and/or web-based communication networks) 120. In the example of FIG. 1, the NAD 106 exchanges data and/or communicates (e.g., wirelessly) with an example alert dispatcher 122, as represented by a first example communication link 124. In particular, when the control circuitry 108 is connected to the NAD 106, the NAD 106 provides the control circuitry 108 with access to the external network(s) 120. In this manner, the control circuitry 108 can direct the alert dispatcher 122 to dispatch one or more user alerts (e.g., the primary alert and/or the secondary alert) generated by the control circuitry 108. In some examples, the NAD 106 can be implemented using an electronic control unit (ECU) of a telematics device of the vehicle 102. In the example of FIG. 1, the NAD 106 is operatively coupled to the vehicle 102 and/or the control circuitry 108, for example, via the bus 110. For example, the NAD 106 of FIG. 1 is connected (e.g., electrically) to the bus 110 of the vehicle 102.

The bus 110 of FIG. 1 facilitates interactions and/or communications between different electronic components of the vehicle 102. The bus 110 can be implemented, for example, via one or more signal or transmission wires, as discussed further below in connection with FIG. 2. In some examples, the bus 110 includes a CAN bus. In such examples, the bus 110 forms and/or defines at least part of a vehicle network (e.g., a CAN) of the vehicle 102 over which the above-described messages can be broadcasted. In particular, the bus 110 is configured to transmit or convey the messages generated by the different electronic components of the vehicle 102.

The primary user device 112 of FIG. 1 can be used by the first person (i.e., a user of the primary user device 112), who is one or more (e.g., all) of (a) a driver of the vehicle 102, (b) the owner of the vehicle 102, (c) a person occupying the vehicle 102 (i.e., a vehicle occupant), and/or (d) a person most likely to use the vehicle 102. In some examples, the primary user device 112 includes a mobile device belonging to the first person such as a smartphone, a tablet, and/or, more generally, an electronic device having wireless and/or web-based communication capability (e.g., via satellite networks, cellular networks, other communication networks having access to the Internet, etc.). In particular, the primary user device 112 includes a first processor 126 that exchanges data and/or communicates with the alert dispatcher 122, as represented by a second example communication link 128. The user of the first user device 112 can interact (e.g., view data and/or enter data) with the alert dispatcher 122, for example, via one or more user interfaces (e.g., human machine interfaces (HMIs) and/or graphical user interfaces (GUIs)) such as a first GUI 130 of the first processor 126.

In some examples, the alert dispatcher 122 enables the user of the primary user device 112 to receive a user alert generated by the control circuitry 108. For example, the first user device 112 is configured to notify the first person of the primary alert provided by the control circuitry 108 when the first user device 112 receives the primary alert from the alert dispatcher 122. To notify the first person of the primary alert, the first user device 112 can, for example, display a certain message on a screen of the first user device 112 based on the primary alert and/or generate a certain sound via a transducer or speaker of the first user device 112 based on the primary alert. Further, in some examples, the alert dispatcher 122 also enables the user of the primary user device 112 to respond to the primary alert, for example, by providing one or more appropriate inputs to the first user device 112. For example, the first person can provide a confirmation to the first user device 112 in response to receiving the primary alert, which may prevent the secondary alert from being dispatched by the alert dispatcher 122. Additionally, the first processor 126 of FIG. 1 can be provided with a first example database 132 that can store, for example, the primary alert received from the alert dispatcher 122 and/or data provided by the user of the first user device 112.

On the other hand, the second user device(s) 114 of FIG. 1 can be used by one or more different persons (i.e., user(s) of the second user device(s) 114) who may be related to and/or generally associated with the first person. In some examples, each of second user device(s) 114 includes a mobile device belonging to a family member of the first person, a friend of the first person, etc. such as a smartphone, a tablet, and/or, more generally, an electronic device having wireless and/or web-based communication capability. That is, in such examples, one or more of the secondary user device(s) 114, 116 of FIG. 1 include a mobile device belonging to a person related to the first person. Similar to the primary user device 112, each of the second user device(s) 114 can include a second processor (not shown) that exchanges data and/or communicates (e.g., wirelessly) with the alert dispatcher 122, as represented by a third communication link 134. In particular, the alert dispatcher 122 can enable the user(s) of the second user device(s) 114 to receive the secondary alert generated by the control circuitry 108. For example, the second user device(s) 114 is/are configured to notify the different person(s) of the secondary alert provided by the control circuitry 108 when the second user device(s) 114 receive the secondary alert from the alert dispatcher 122. Then, the user(s) of the second user device(s) 114 can appropriately respond to the secondary alert, for example, by contacting the first person about the malicious message and/or instructing the first person to take the vehicle 102 to one or more vehicle service providers 118 for inspection.

Further, the third user device(s) 116 of FIG. 1 can belong to and/or be used by one or more owners, employees, and/or personnel (i.e., user(s) of the third user device(s) 116) of the vehicle service provider(s) 118. In the example of FIG. 1, the vehicle service provider(s) 118 can include businesses providing, for example, any of in-vehicle security, emergency services, hands-free calling, remote diagnostics, etc. For example, the vehicle service provider(s) 118 can include OnStar®. Additionally or alternatively, the vehicle service provider(s) 118 can include business providing, for example, vehicle maintenance services such as oil changes, tire rotations, etc. In any case, the vehicle service provider(s) 118 of FIG. 1 are associated with and/or correspond to the third user device(s) 116. The third user device(s) 116 may include one or more electronic devices accessible to the owner(s), employee(s), and/or personnel of the vehicle service provider(s) 118 such as, for example, computers, smartphones, tablets, and/or, more generally, electronic devices having wireless and/or web-based communication capability. Each of the third user device(s) 116 may include a third processor (not shown) that exchanges data and/or communicates with the alert dispatcher 122, as represented by the fourth communication link 136. In particular, the alert dispatcher 122 can enable the user(s) of the third user device(s) 116 to receive the secondary alert provided by the control circuitry 108. Then, the user(s) of the third user device(s) 116 can appropriately respond to the secondary alert, for example, by contacting the first person about the malicious message and/or instructing the first person to take the vehicle 102 to the vehicle service provider(s) 118 for inspection.

Additionally, in some examples, the vehicle 102 of FIG. 1 also includes an example vehicle output device 142, which facilitates communicating (e.g., visually and/or audibly) the alert(s) to a person in a vehicle cabin or within close proximity to the vehicle 102. The vehicle output device 142 can be implemented, for example, using one or more display devices or screens (e.g., including a touch screen), one or more light-emitting diodes (LEDs), one or more speakers, etc., any other suitable output device(s) and/or user device (s), or a combination thereof. That is, the vehicle output device 142 of FIG. 1 can be a single device or multiple devices. The vehicle output device 142 is sometimes referred to as a user device and, in some examples, corresponds to a primary user device to which the primary alert is sent. The vehicle output device 142 can be operatively coupled to the control circuitry 108 via the bus 110 to receive one or more control signals or commands and/or electrical power from the control circuitry 108. Further, the vehicle output device 142 can be positioned within the vehicle 102, for example, on a vehicle control panel (e.g., a dashboard), a center console, etc. In particular, the vehicle output device 142 is configured to generate information (e.g., visual information and/or audible information) based on the control signal(s) or command(s) and/or electrical power received from the control circuitry 108. Further, the output device 142 is configured to present the information to one or more users in or near the vehicle 102, for example, by generating text, one or more images, a video, one or more sounds, natural language speech, etc. In such examples, in response to the IDS 104 detecting a malicious message on the bus 110, the control circuitry 108 directs the vehicle output device 142 to present an alert (e.g., the primary alert) that is indicative of the malicious message. However, in other examples (e.g., where the vehicle output device 142 may be compromised and/or hacked), the control circuitry 108 may only provide, via the NAD 106 and the alert dispatcher 122, the alert(s) to the first user device 112, the second user device(s) 114, and/or the third user device(s) 116.

The control circuitry 108 of FIG. 1 can be implemented, for example, using one or more microcontrollers, one or more ECUs, etc., any other suitable computing device(s), or a combination thereof. In the example of FIG. 1, the control circuitry 108 is operatively coupled, via the bus 110, to one or more (e.g., all) of the IDS 104, the NAD 106, the vehicle output device 142, and/or, more generally, the vehicle 102. Additionally, the control circuitry 108 can be similarly coupled to one or more other suitable components, devices, and/or systems of the vehicle 102 via the bus 110. In particular, the control circuitry 108 of FIG. 1 is configured to initiate the alert process of the vehicle 102 to automatically provide the user alert(s). During the alert process, the control circuitry 108 directs the IDS 104 to monitor the bus 110 for messages being sent on bus 110. If a malicious message is detected, the control circuitry 108 then generates the user alert(s) and directs the NAD 106 to transmit, via the external network(s) 120, the user alert(s) to the alert dispatcher 122 for dispatching. Then, the alert dispatcher 122 dispatches, via the external network(s) 120, the alert(s) to the user device(s) 112, 114, 116. In some examples, the alert dispatcher 122 can be accessed by the control circuitry 108 through the NAD 106, which enables the control circuitry 108 to control how the alert(s) is/are dispatched in real-time. For example, the control circuitry 108 can direct the alert dispatcher 122 to dispatch (e.g., simultaneously), via the external network(s) 120, the alert(s) to the primary user device 112, one or more (e.g., all) of the second user device(s) 114, one or more (e.g., all) of the third user device(s) 116, or a combination thereof. In this manner, the control circuitry 108 of FIG. 1 transmits, via the NAD 106, the alert(s) to the primary user device 112 and/or the secondary user device(s) 114, 116.

In some examples, the control circuitry 108 and the alert dispatcher 122, together, are configured to provide the same user alert (e.g., the primary or secondary alert) to one or more (e.g., all) of the user device(s) 112, 114, 116 shown in FIG. 1. Further, in some examples, the primary alert is substantially the same relative to the secondary alert, for example, regarding information provided by the primary and second alerts. On the other hand, in some examples, the control circuitry 108 and the alert dispatcher 122, together, are configured to provide different or unique user alerts to at least some of the user device(s) 112, 114, 116 shown in FIG. 1, which is discussed in greater detail in connection with FIGS. 3 and 4.

In some examples, the system 100 includes a cloud computing platform 138 having a server 140 (e.g., an Internet server) that hosts the alert dispatcher 122. In the example of FIG. 1, the alert dispatcher 122 exchanges data and/or communicates with one or more vehicles (e.g., the vehicle 102) and one or more user devices (e.g., the first user device 112, at least some or all of the second user device(s) 114, and/or at least some or all of the third user device(s) 116) via the external network(s) 120, as represented by the first communication link 124, the second communication link 128, the third communication link 134, and/or the fourth communication link 136. That is, according to the illustrated example of FIG. 1, the alert dispatcher 122 is communicatively coupled, via the external network(s) 120, to the NAD 106, the primary user device 112, and one or more (e.g., all) of the secondary user device(s) 114, 116. The external network(s) 120 of FIG. 1 can include, for example, one or more radio access networks (RANs), one or more cellular networks, one or more satellite networks, one or more wireless local area networks (LANs), one or more wide area networks (WANs), the Internet, etc., any other suitable network(s) that may use the Internet, or a combination thereof. In particular, the alert dispatcher 122 of FIG. 1 is configured to receive the alert(s) from the NAD 106 during the alert process and dispatch the alert(s) to the primary user device 112 and/or one or more (e.g., all) of the secondary user device(s) 114, 116.

While an example manner of implementing the system 100 is illustrated in FIG. 1, one or more of the elements, processes, and/or devices illustrated in FIG. 1 may be combined, divided, rearranged, omitted, eliminated, and/or implemented in any other way. Further, the example system 100 of FIG. 1 may include one or more elements, processes, and/or devices in addition or alternatively to those illustrated in FIG. 1, and/or may include more than one of any of the illustrated elements, processes, and devices. In the example of FIG. 1, the IDS 104 and the NAD 106 are depicted as separate from and connected to the control circuitry 108. However, in some examples, some or all of the operations of the IDS 104 and/or the NAD 106 may be resident in the control circuitry 108, for example, via at least one controller (e.g., an ECU) of the vehicle 102, as discussed further below.

Figure 2:
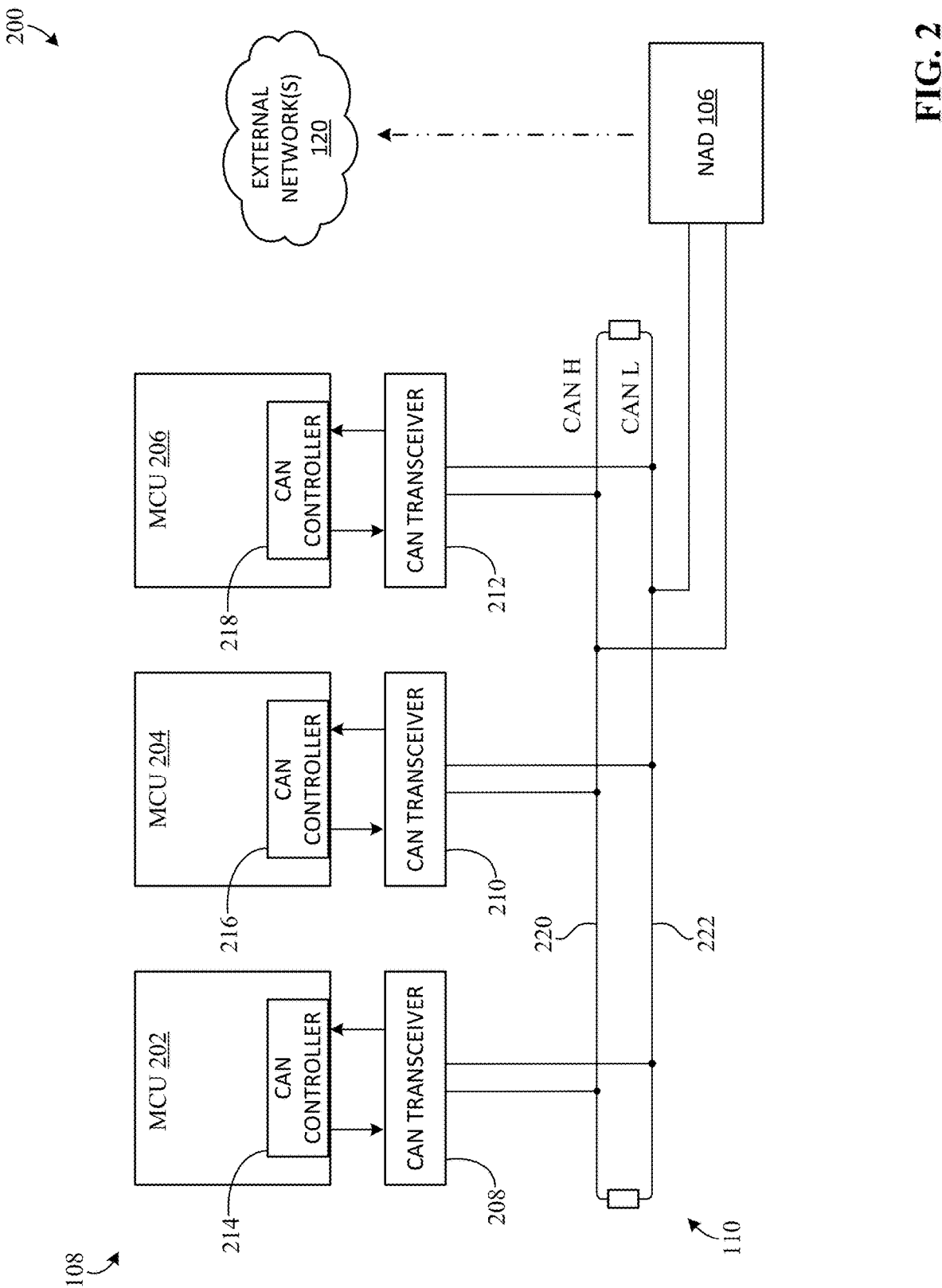
FIG. 2 illustrates a schematic diagram of an example architecture scheme that can be used to implement the example vehicle shown in FIG. 1.

FIG. 2 illustrates a schematic diagram of an example architecture scheme 200 that can be used to implement the vehicle 102 of FIG. 1 in accordance with the teachings of this disclosure. According to the illustrated example of FIG. 2, the architecture scheme 200 includes the NAD 106, the bus 110, one or more example vehicle controllers (e.g., microcontrollers or ECUs) 202, 204, 206, and one or more example CAN transceivers 208, 210, 212. That is, the vehicle 102 can include the vehicle controller(s) 202, 204, 206 to facilitate providing automatic functions and/or controls of the vehicle 102, three of which are shown in this example (i.e., a first vehicle controller 202, a second vehicle controller 204, and a third vehicle controller 206). Although FIG. 2 illustrates the three controllers 202, 204, 206, in some examples, the vehicle 102 can be implemented differently, for example, using one or more (e.g., 50, 75, 100, etc.) other vehicle controllers. In particular, one or more (e.g., all) of the vehicle controller(s) 202, 204, 206 can be used to implement the control circuitry 108 of FIG. 1. Accordingly, in some examples, the control circuitry 108 includes one or more (e.g., all) of the vehicle controller(s) 202, 204, 206 shown in FIG. 2, each of which is connected (e.g., electrically) to the bus 110. Further, the vehicle 102 may also include the CAN transceivers 208, 210, 212 of FIG. 2, three of which are shown in this example (i.e., a first CAN transceiver 208, a second CAN transceiver 210, and a third CAN transceiver 212). The CAN transceiver(s) 208, 210, 212 provide the vehicle controller(s) 202, 204, 206 with access to the bus 110 and/or the vehicle network associated therewith. In particular, each of the CAN transceivers 208, 210, 212 is configured to receive or obtain one or more of the above-described messages from the bus 110 and/or transmit such messages through the bus 110.

The vehicle controller(s) 202, 204, 206 of FIG. 2 are provided with respective CAN controllers 214, 216, 218, each of which is configured to interact with a respective one of the CAN transceivers 208, 210, 212. That is, in the illustrated example of FIG. 2, the first vehicle controller 202 includes a first CAN controller 214 configured to interact with the first CAN transceiver 208, the second vehicle controller 204 includes a second CAN controller 216 configured to interact with the second CAN transceiver 210, and the third vehicle controller 206 includes a third CAN controller 218 configured to interact with the third CAN transceiver 212. For example, the first CAN controller 214 of FIG. 2 is communicatively coupled to the first CAN transceiver 208 to provide data to the first CAN transceiver 208 and/or receive data from the CAN transceiver 208, for example, via one or more signal or transmission wires, a bus, radio frequency, etc. The other CAN controllers 216, 218 and CAN transceivers 210, 212 can be coupled together in a similar manner.

During operation of the vehicle, the vehicle controller(s) 202, 204, 206 and/or the NAD 106 are configured to generate messages and provide the messages to each other via the bus 110. For example, the first vehicle controller 202 can direct the first CAN controller 214 to generate or encode a first message and transmit the first message to the first CAN transceiver 208 for transmission through the bus 110. The first message can include, for example, a data packet or a CAN packet associated with operating a particular system (e.g., one of a braking system, a steering system, a throttle system, a heating, ventilation, and air conditioning (HVAC) system, etc.) of the vehicle 102. In response to receiving the first message from the first CAN controller 214, the first CAN transceiver 208 is configured to transmit the first message through the bus 110. That is, the first CAN transceiver 208 of FIG. 2 is configured to broadcast the first message over the vehicle network, thereby enabling one or more (e.g., all) of the other vehicle controllers 204, 206 and/or the NAD 106 to receive or obtain the first message and/or take action accordingly. Conversely, the first CAN controller 214 can also decode and/or process the messages received from the first CAN transceiver 208 and provide the processed messages to the first vehicle controller 202. Such aspects described in connection with the first CAN transceiver 208, the first CAN controller 214, and/or, more generally, the first vehicle controller 202 can likewise apply to the second vehicle controller 204, the third vehicle controller 206, one or more other controllers of the vehicle 102, and/or the NAD 106.

In some examples, at least some or all of the messages transmitted through the bus 110 of FIG. 2 include any of (a) data frame type messages, (b) remote frame type messages, (c) overload frame type messages, (d) error frame type messages, etc., any other suitable messages transmittable through the bus 110, or a combination thereof. Such messages are sometimes referred to as message frames and/or CAN message frames. In particular, the messages may be generated in accordance with one or more communication standards such as, for example, any of Standard CAN, Extended CAN, etc.

According to the illustrated example of FIG. 2, the bus 110 forms and/or defines a pathway through which data is transmittable. In some examples, the bus 110 includes a first channel (e.g., a high channel) 220 and a second channel (e.g., a low channel) 222 different and/or separate from the first channel 220. In such examples, each of the first and second channels 220, 222 of FIG. 2 can be implemented, for example, using a dedicated signal or transmission wire for communication that can be routed through at least part of the vehicle 102. The first channel 220 of FIG. 2 is configured to carry a first voltage, and the second channel 222 is configured to carry a second voltage. When data is being transmitted, the voltage carried by the first channel 220 can change (e.g., increase) and/or be different (e.g., higher) relative to the voltage carried by the second channel 222, thereby generating a voltage differential between first and second channels 220, 222 to enable and/or facilitate communication. Electrical power can be supplied through the first channel 220, the second channel 222, and/or, more generally, the bus 110. Alternatively, a power supply for any bus module(s) can be arranged separately. Wiring for such a power supply can be either totally separate from the two bus channels 220, 222, or it can be integrated, for example, into the same cable as the two bus channels 220, 222.

Figure 3:
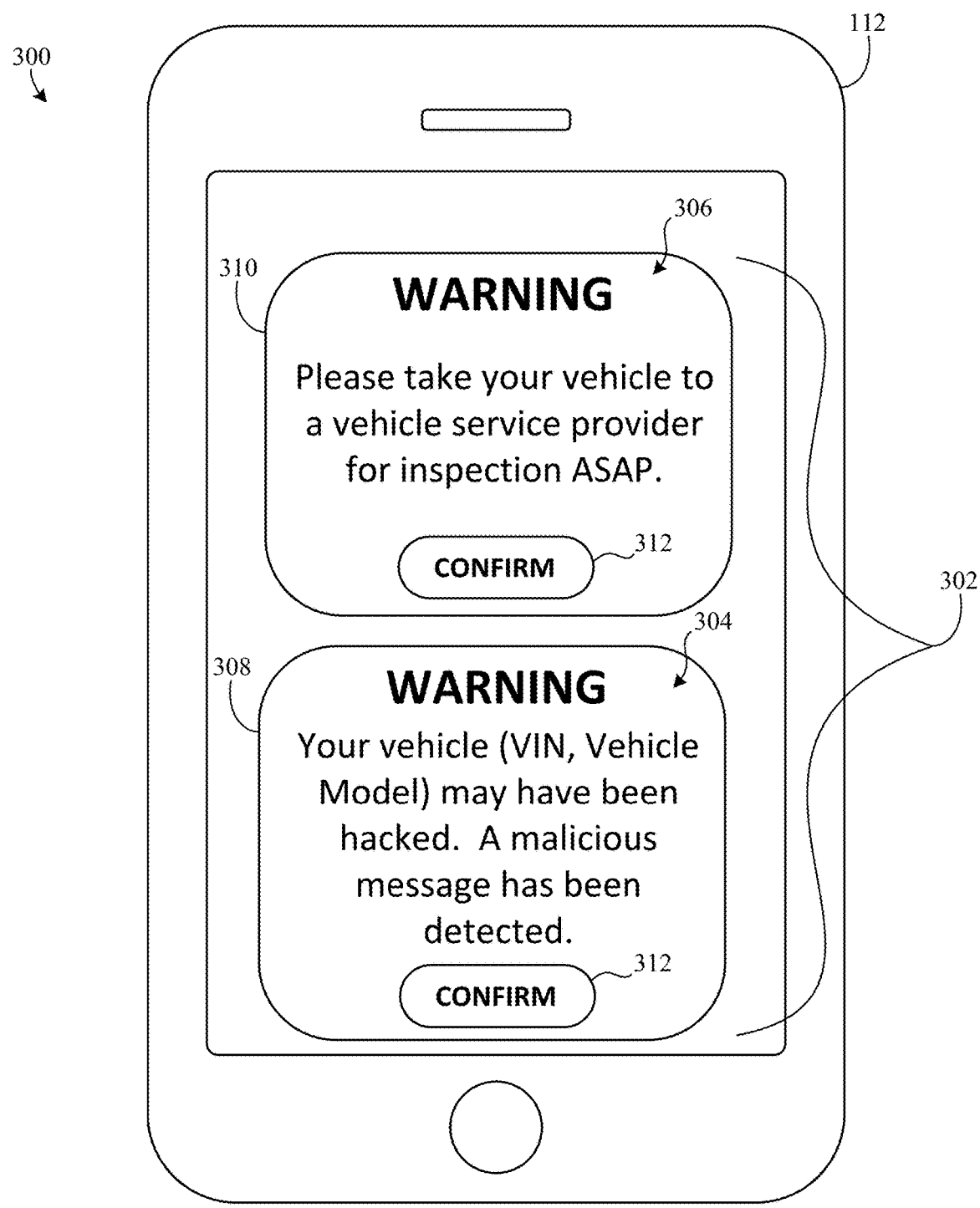
FIG. 3 illustrates an example display of an example graphical user interface associated with one or more of the example user devices shown in FIG. 1.

FIG. 3 illustrates a first example screen or graphic display 300 of the primary user device 112 shown in FIG. 1 or the first GUI 130 thereof and shows an example primary alert 302 (e.g., generated by the control circuitry 108 and dispatched by the alert dispatcher 122) in accordance with the teachings of this disclosure. The primary alert 302 includes, for example, one or more example messages or notifications 304, 306 viewable and/or observable by the user of the primary user device 112, two of which are shown in this example (i.e., a first notification 304 and a second notification 306). For example, the first graphic display 300 generates and/or includes a first window 308 that displays (e.g., via natural language text) the first notification 304 based on data transmitted from the alert dispatcher 122 to the primary user device 112. In particular, the first notification 306 notifies the first person about the certain detected condition of the vehicle 102 and/or the detected vehicle network event. Additionally or alternatively, in some examples, the first graphic display 300 generates and/or includes a second window 310 that displays (e.g., via natural language text) the second notification 306 based on the data transmitted from the alert dispatcher 122 to the primary user device 112.

As previously described, the primary alert 302 can include one or more instructions to the first person to minimize potential risks to an occupant of the vehicle 102. In particular, the second notification 306 of FIG. 3 instructs the first person to take the vehicle 102 to a vehicle service provider (e.g., one of the vehicle service provider(s) 118 of FIG. 1) for inspection of the vehicle 102. Of course, the primary user device 112 of FIG. 3 can be configured to make one or more sounds (e.g., any of a chime, natural language speech corresponding to the notification(s) 304, 306, etc.) based on the data transmitted from the alert dispatcher 122 to the primary user device 112, which increases a likelihood that the user of the primary user device 112 will notice and/or appropriately respond to the primary alert 302.

Figure 4:
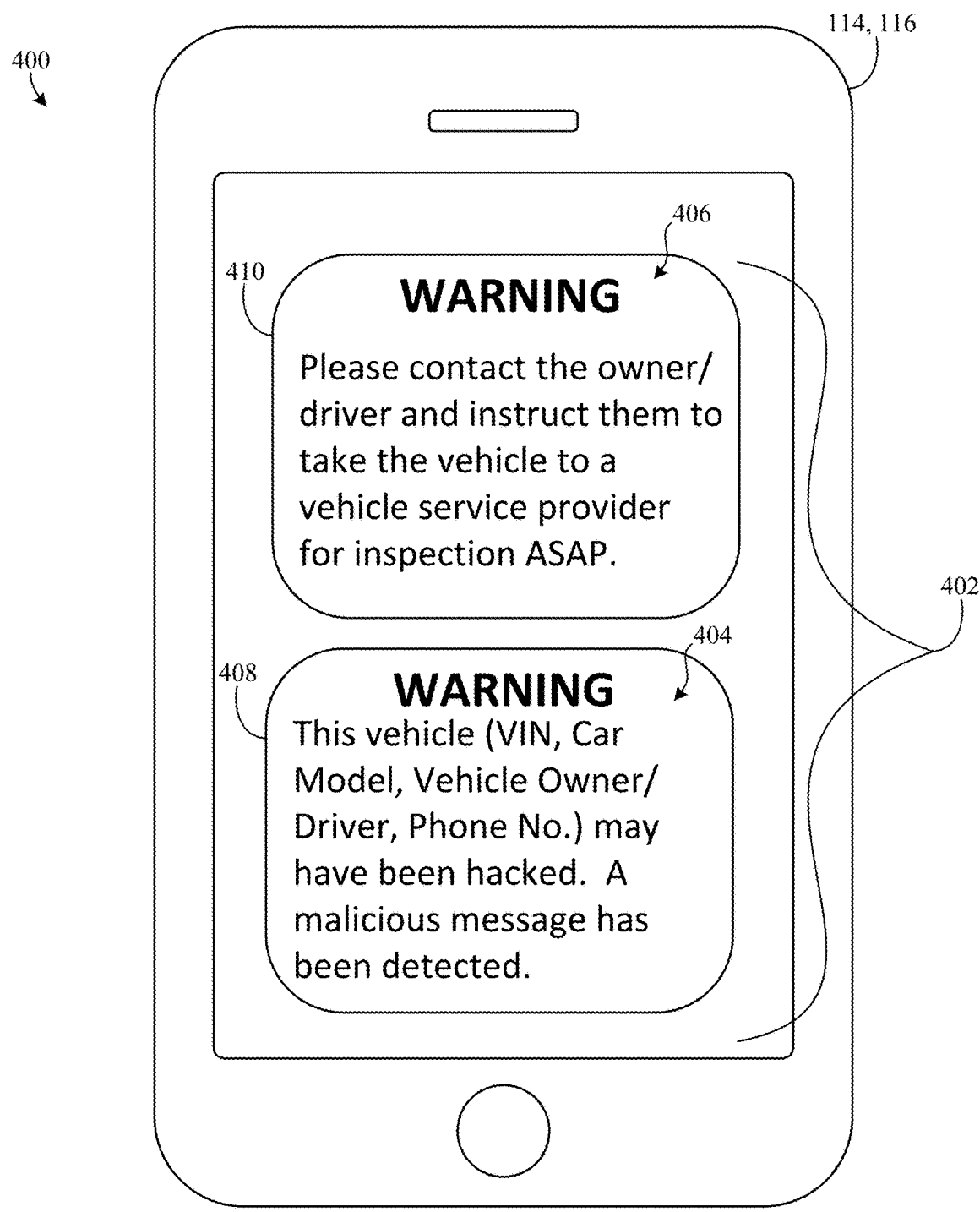
FIG. 4 illustrates an additional example display of an example graphical user interface associated with one or more of the example user devices shown in FIG. 1.

In some examples, the primary alert 302 of FIG. 4 includes (e.g., encoded and/or embedded therein) information associated with the vehicle 102, which may aid the first person in identifying the vehicle 102, for example, if the first person owns or regularly drives multiple vehicles or is not currently in the vehicle 102. For example, as shown in FIG. 3, the primary alert 302 or the first notification 304 thereof can include any of a vehicle identification number (VIN) of the vehicle 102, a model of the vehicle 102, etc., any other suitable identifying information of the vehicle 102, or combination thereof.

Although FIG. 3 depicts the two notifications 304, 306, in some examples, the primary alert 302 can be implemented differently while still sufficiently notifying and/or instructing the first person. For example, the primary alert 302 of FIG. 3 can include a single notification that (a) notifies the first person regarding the detected condition of the vehicle 102 and/or (b) instructs the first person to take the vehicle 102 to the vehicle service provider for inspection. Of course, the first notification 304 and/or the second notification 306 could include different language, phrasing, and/or text other than that shown in the illustrated example of FIG. 3. Additionally or alternatively, the first notification 304 and/or the second notification 306 could be implemented using any one or more of symbols, pictures, images, videos, etc., any other suitable multimedia and/or notification technique(s), or a combination thereof.

Additionally, in some examples, the first display 300 of FIG. 3 can allow the first person to enter or provide information to the alert dispatcher 122 via the first GUI 130. In such examples, the first example display 300 provides for user inputs with respect to information or data associated with responding to the primary alert 302. In particular, the user of the first user device 112 can provide a confirmation to the alert dispatcher 122 by providing one or more inputs such as via typing, talking, touching (e.g., via a screen responsive to touch) and/or other input methods. For example, the user of the first user device 112 can submit and/or provide the confirmation via a selection input such as, for example, selecting a confirm button 312. Such a confirmation can aid the alert dispatcher 122 in determining whether to dispatch the secondary alert to the secondary user device(s) 114, 116.

FIG. 4 illustrates a second example screen or graphic display 400 of one of the secondary user device(s) 114, 116 shown in FIG. 1 or a GUI thereof and shows an example secondary alert 402 (e.g., generated by the control circuitry 108 and dispatched by the alert dispatcher 122) in accordance with the teachings of this disclosure. The secondary alert 402 includes, for example, one or more example messages or notifications 404, 406 viewable and/or observable by the user(s) of the secondary user device(s) 114, 116, two of which are shown in this example (i.e., a third notification 404 and a fourth notification 406). For example, the second graphic display 400 generates and/or includes a third window 408 that displays the third notification 404 based on data transmitted from the alert dispatcher 122 to the secondary user device(s) 114, 116, for example, via natural language text. In particular, the third notification 404 notifies the different person(s) and/or the vehicle service provider(s) 118 about the detected condition of the vehicle 102 and/or the detected vehicle network event. Additionally or alternatively, in some examples, the second graphic display 400 generates and/or includes a fourth window 410 that displays the fourth notification 406 based on the data transmitted from the alert dispatcher 122 to the secondary user device(s) 114, 116, for example, via natural language text.

As previously described, the secondary alert 402 can include one or more instructions to the different person(s) and/or the vehicle service provider(s). In the example of FIG. 4, the fourth notification 406 of FIG. 3 instructs the different person(s) and/or the vehicle service provider(s) 118 to contact a driver of the vehicle (e.g., the first person) and instruct the driver to take the vehicle 102 to a vehicle service provider (e.g., one of the vehicle service provider(s) 118 of FIG. 1) for inspection. Of course, the secondary user devices 114, 116 of FIG. 4 can be configured to make one or more sounds (e.g., any of a chime, natural language speech corresponding to the notification(s) 404, 406, etc.) based on the data transmitted from the alert dispatcher 122 to the secondary user device(s) 114, 116, which increases a likelihood that the user(s) of the secondary device(s) 114, 116 will notice and/or appropriately respond to the secondary alert 402.

In some examples, the secondary alert 402 of FIG. 4 includes information associated with the vehicle 102 and/or the first person, which may aid the different person(s) and/or the vehicle service provider(s) 118 in identifying the vehicle 102 as well as in identifying and/or contacting the first person. For example, as shown in FIG. 4, the secondary alert 402 or the third notification 404 thereof can include any of the VIN of the vehicle 102, the model of the vehicle 102, a name of an owner and/or driver of the vehicle 102 (e.g., the first person), contact information (e.g., a mobile phone number) of the owner and/or driver, etc., any other suitable identifying information, or a combination thereof. In some examples, the contact information encoded in and/or provided by the secondary alert 402 includes a primary number corresponding to the first user device 112, which enables the different person(s) and/or the vehicle service provider(s) 118 to quickly contact the first person upon receiving the secondary alert 402.

Although FIG. 4 depicts the two notifications 404, 406, in some examples, the secondary alert 402 can be implemented differently while still sufficiently notifying and/or instructing the different person(s) and/or the vehicle service provider(s) 118. For example, the secondary alert 402 of FIG. 4 can include a single, combined notification, similar to the primary alert 302 previously described in connection with FIG. 3. Of course, the third notification 404 and/or the fourth notification 406 could include different language, phrasing, and/or text other than that shown in the illustrated example of FIG. 4. Additionally or alternatively, the third notification 404 and/or the fourth notification 406 could be implemented using any one or more of symbols, pictures, images, videos, etc., any other suitable multimedia and/or notification technique(s), or a combination thereof.

As previously described, in some examples, the control circuitry 108 and the alert dispatcher 122 can provide the same user alert to the primary user device 112 and the secondary user device(s) 114, 116. In such examples, the user alert may include the information of the secondary alert 402 illustrated in FIG. 4, which may be more effective in quickly carrying out the alert process of the vehicle 102.

Figure 5:
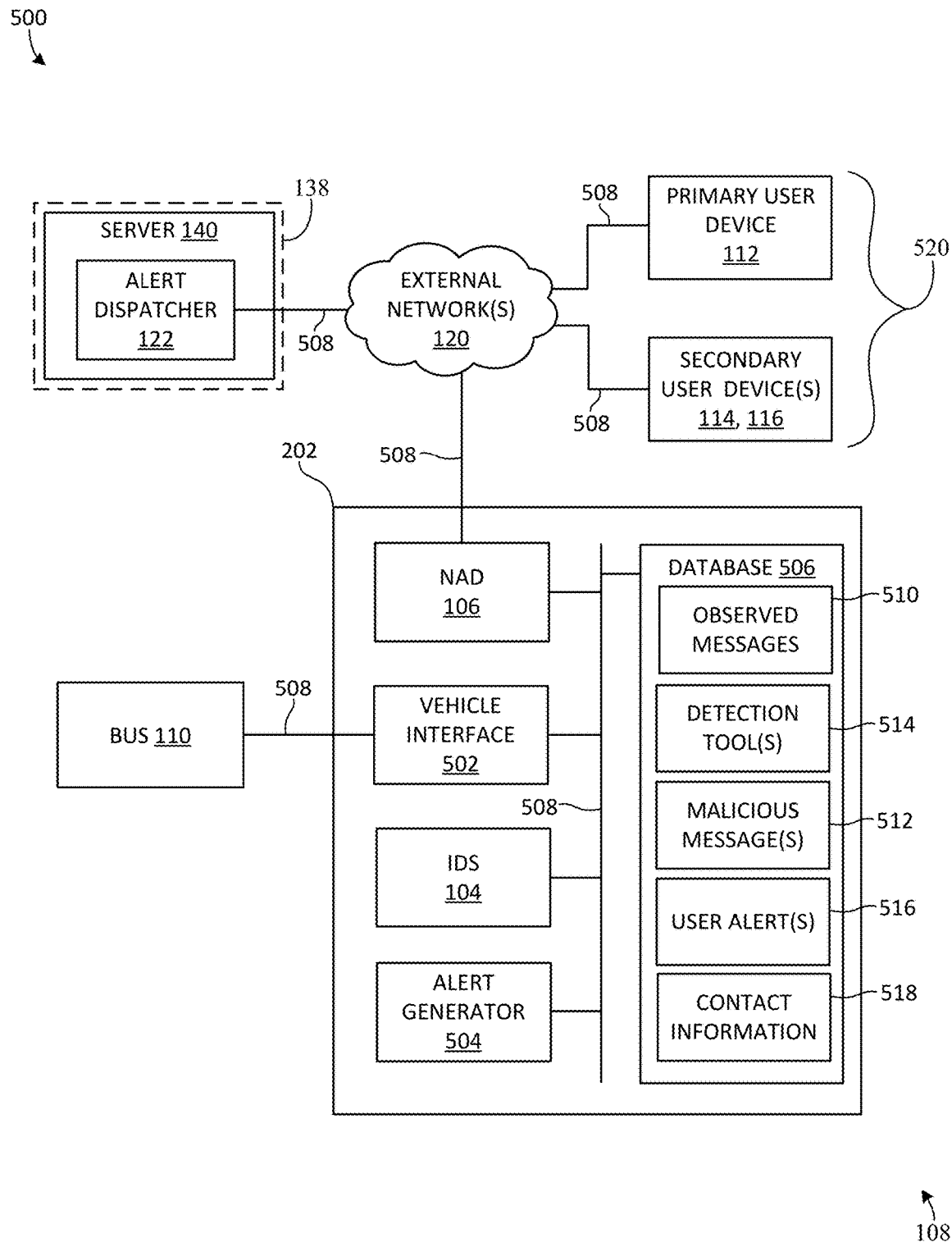
FIG. 5 is a block diagram of an example alert control system for a vehicle in accordance with the teachings of this disclosure.

FIG. 5 is a block diagram of an example alert control system 500 for a vehicle in accordance with the teachings of this disclosure. The alert control system 500 can be implemented, for example, by any one or more (e.g., all) of the control circuitry 108 of FIG. 1, the cloud computing platform 138 of FIG. 1, and/or the server 140 of FIG. 1. Additionally or alternatively, the alert control system 500 or part thereof can be implemented by one or more (e.g., all) of the vehicle controller(s) 202, 204, 206 of FIG. 2, the primary user device 112 of FIGS. 1 and 3, and/or one or more (e.g., all) of the secondary user device(s) 114, 116 of FIGS. 1 and 4. According to the illustrated example of FIG. 5, the alert control system 500 includes the IDS 104, the NAD 106, the alert dispatcher 122, an example vehicle interface 502, an example alert generator 504, and an example database 506. The alert control system 500 of FIG. 5 is communicatively coupled to the bus 110 of the vehicle 102, the primary user device 112, the secondary user device(s) 114, 116, and the external network(s) 120 via one or more example communication links 508 such as, for example, one or more signal or transmission wires, a bus, radio frequency, etc., any other suitable link(s) capable of transmitting data, or a combination thereof. In particular, the alert dispatcher 122 of FIG. 5 is configured to dispatch one or more user alerts generated by the alert generator 504 and/or otherwise provide the user alert(s) to the primary user device 112 and/or one or more (e.g., all) of the secondary user devices 114, 116.

In the example of FIG. 5, the vehicle interface 502 facilitates interactions and/or communications between the alert control system 500 and one or more electronic devices of the vehicle 102. In some examples, the vehicle interface 502 is implemented by at least one CAN transceiver and at least one CAN controller such as, for example, the first CAN transceiver 208 of FIG. 2 and the first CAN controller 214 of FIG. 2. The vehicle interface 502 of FIG. 5 is communicatively coupled to the bus 110 of the vehicle 102 via the communication link(s) 508 to receive (e.g., continuously and/or repeatedly) data from the bus 110 and/or provide (e.g., continuously and/or repeatedly) data to the bus 110. Such data handled by the vehicle interface 502 includes example observed messages (e.g., data packets such as CAN packets) 510 transmitted through the bus 110 and/or broadcasted over the vehicle network, for example, that may be indicative of commands for one or more systems and/or devices of the vehicle 102. The vehicle interface 502 can then store the observed messages 510 in the database 506 for processing by the IDS 104. Additionally or alternatively, the vehicle interface 502 can provide the observed messages 510 directly to the IDS 104 for processing.

In the example of FIG. 5, the IDS 104 of FIG. 5 is communicatively coupled to the vehicle interface 502 and/or the database 506 via the communication link(s) 508 to receive (e.g., continuously and/or repeatedly) the observed messages 510 and/or any other suitable data. In particular, the IDS 104 of FIG. 5 is configured to process one or more (e.g., all) of the observed messages 510 to determine whether one or more of the observed messages 510 is/are likely malicious message(s) 512. In other words, the vehicle interface 502 may receive the malicious message(s) 512 from the bus 110, which can be detected by the IDS 104 relatively quickly. Such a malicious message 512 is typically associated with disabling the system(s) and/or device(s) of the vehicle 102 and/or otherwise interfering with normal operation thereof. To facilitate making such a determination or detection when processing the observed messages 510, the IDS 104 can advantageously utilize one or more example detection tools 514 (e.g., stored in the database 506 and/or installed on the IDS 104), which include one or more programs and/or software associated with detecting an intrusion and/or an attempted intrusion of a vehicle CAN or the bus 110 thereof. More particularly, in response to determining that at least one of the observed messages 510 is likely malicious (i.e., in response to detecting a malicious message 512), the IDS 104 is configured to trigger the alert generator 504. For example, the IDS 104 provides data to the alert generator 504 indicating to the alert generator 504 that (a) at least one malicious message 512 transmitted over the bus 110 has been detected and (b) the alert process of the vehicle 102 should be initiated. In some examples, the detection tool(s) 514 can be implemented, for example, using Snort, Suricata, Darktrace Enterprise Immune System, Open Source HIDS SECurity (OSSEC), etc., any other suitable IDS software tool(s), or a combination thereof.

In the example of FIG. 5, the alert generator 504 is communicatively coupled to the IDS 104 and/or the database 506 via the communication link(s) 508 to receive at least one of the malicious message(s) 512 and/or the data provided by the IDS 104. In particular, the alert generator 504 of FIG. 5 is configured to generate one or more example user alerts 516 in response to the IDS 104 detecting at least one of the malicious message(s) 512. The user alert(s) 516 of FIG. 5 include, for example, one or more primary alerts (e.g., see the primary alert 302 of FIG. 3) and/or one or more secondary alerts (e.g., see the secondary alert 402 of FIG. 4), as previously described. Further, the alert generator 504 of FIG. 5 is communicatively coupled to the NAD 106 via the communication link(s) 508. After generating the user alert(s) 516, the alert generator 504 can store the user alert(s) 516 in the database 506 and/or provide the user alert(s) 516 directly to the NAD 106 for transmission via the external network(s) 120.

In some examples, the alert generator 516 advantageously encodes and/or embeds certain data in the user alert(s) 516, which can be accessed by any of the alert dispatcher 122, the user of the primary user device 112, and/or the user(s) of the secondary user device(s) 114, 116. In such examples, the alert generator 516 can encode and/or embed identifying information associated with the first person in the user alert(s) 516 such as, for example, the name of the first person. Further, the alert generator 516 can encode and/or embed identifying information associated with the vehicle 102 in the user alert(s) 516 such as, for example, any of the VIN of the vehicle 102, the model of the vehicle 102, etc. Additionally or alternatively, in such examples, the alert generator 516 can encode and/or embed example contact information 518 in the user alert(s) 516.

The contact information 518 of FIG. 5 is associated with the first person, the different person(s), the owner(s), the employee(s), and/or the personnel previously described. For example, the contact information 518 can include the primary number corresponding to the first user device 112. In another example, the contact information 518 can include one or more secondary numbers (e.g., any of mobile phone numbers, telephone numbers, etc.) corresponding to respective one(s) of the second user device(s) 114 and/or the third user device(s) 116. More generally, the contact information 518 enables the alert dispatcher 122 to identify and communicate with, via the external network(s) 120, one or more (e.g., all) of the user device(s) 112, 114, 116 shown in FIG. 1. Additionally, in some examples, at least some of the contact information 518 enables user(s) of the secondary user device(s) 114, 116 to contact the first person or the first user device 112 thereof. In such examples, the contact information 518 can be presented to the user(s) of the secondary user device(s) 114, 116 when the secondary user device(s) 114, 116 receive the user alert(s) 516 from the alert dispatcher 122.

In some examples, the vehicle interface 502 obtains at least some of the contact information 518 via the bus 110. For example, the primary number and/or the secondary number(s) can be stored (e.g., by the first person) in a database of the vehicle 102 that is connected to the bus 110 and accessible to the vehicle interface 502. Such a database of the vehicle 102 can be associated with an infotainment device and/or a telematics device. Further, the NAD 106 can be configured to communicate with one or more external resources and/or databases via the network(s) 120 to identify, access, and/or obtain at least some or all of the contact information 518.

In the example of FIG. 5, the NAD 106 is communicatively coupled to the alert dispatcher 122 via the external network(s) 120 and the communication link(s) 508 to provide (e.g., continuously and/or repeatedly) data to the alert dispatcher 122 and/or receive (e.g., continuously and/or repeatedly) data form the alert dispatcher 122. The NAD 106 of FIG. 5 is also communicatively coupled to the alert generator 504 via the communication link(s) 508 to receive the user alert(s) 516 from the alert generator 504. In particular, the NAD 106 is configured to transmit the user alert(s) 516 to the alert dispatcher 122 for dispatching. Additionally, the NAD 106 of FIG. 5 can transmit the contact information 518 to the alert dispatcher 122 separate from or with the user alert(s) 516.

In the example of FIG. 5, the alert dispatcher 122 determines when and/or how to dispatch the user alert(s) 516. In some examples, the alert dispatcher 122 first sends the primary alert (i.e., one of the user alert(s) 516) to the primary user device 112 based on the contact information 518. In such examples, the alert dispatcher 122 may wait for a time interval to receive a response (e.g., a confirmation) from the primary user device 112. The response indicates to the alert dispatcher 122 that the first person received the primary alert and/or is aware of detected one(s) of the malicious messages 512. For example, after sending the primary alert, the alert dispatcher 122 waits for a relatively short time interval, for example, that is about 1 minute or less. In particular, in such examples, if the primary user device 112 provides a response to the alert dispatcher 122 (e.g., via the first person activating the confirm button 312 of FIG. 3) within the time interval, the alert dispatcher 122 does not dispatch the secondary alert. On the other hand, in such examples, if the alert dispatcher 122 does not receive a response from the primary user device 112 within the time interval, the alert dispatcher 122 proceeds to send the secondary alert (i.e., one of the user alert(s) 516) to one or more (e.g., all) of the secondary user device(s) 114, 116, which increases the likelyhood that the first person will be made aware of the condition of the vehicle 102 and resolve the condition. Alternatively, in some examples, the alert dispatcher 122 is configured to simultaneously send (a) the primary alert to the primary user device 112 and (b) the secondary alert to one or more (e.g., all) of the secondary user device(s) 114, 116.

Additionally or alternatively, in some examples, the alert dispatcher 122 of FIG. 5 is configured to dispatch one of the alert(s) 516 to a first set of user devices 520 (i.e., two or more or multiple user devices) based on the contact information 518 received from the NAD 106. That is, when the alert dispatcher 122 receives the one of the alert(s) 516, the alert dispatcher 122 can transmit the one of the alert(s) 516 to each user device of the first set of user devices 520 through the external network(s) 120. The first set of user devices 520 of FIG. 5 corresponds to the driver of the vehicle and a person different from the driver. In some examples, the first set of user devices 520 includes the first user device 112, one or more (e.g., all) of the second user device(s) 114, and/or one or more (e.g., all) of the third user device(s) 116. Further, in some such examples, the alert dispatcher 122 of FIG. 5 is configured to the simultaneously dispatch the one of the user alert(s) 516 to the first set of user devices 520, for example, such that each device of the first set of user device(s) 520 receives the one of the alert(s) 516 at or near the same time.

In the example of FIG. 5, the database 506 stores (e.g., temporarily and/or permanently) and/or provides access to at least some or all of the data 510, 512, 514, 516, 518 in the database 506. The database 506 of FIG. 5 is communicatively coupled, via the link(s) 508, to the IDS 104, the NAD 106, the vehicle interface 502, and the alert generator 504. In some examples, any one or more (e.g., all) of the IDS 104, the NAD 106, the vehicle interface 502, and/or the alert generator 504 transmit (e.g., repeatedly and/or continuously) data to the database 506. Conversely, in some examples, the database 506 transmits (e.g., repeatedly or continuously) data to any one or more (e.g., all) of the IDS 104, the NAD 106, the vehicle interface 502, and/or the alert generator 504.

While an example manner of implementing the alert control system 500 is illustrated in FIG. 5, one or more of the elements, processes, and/or devices illustrated in FIG. 5 may be combined, divided, rearranged, omitted, eliminated, and/or implemented in any other way. Further, the example alert control system 500 of FIG. 5 may include one or more elements, processes, and/or devices in addition or alternatively to those illustrated in FIG. 5, and/or may include more than one of any of the illustrated elements, processes, and devices. In the example of FIG. 5, the alert dispatcher 122 is depicted as a web-based application that is hosted by the cloud computing platform 138 (e.g., via the server 140). However, any other system architecture may be used. In some examples, some or all of the operations of the alert dispatcher 122 may be resident in the control circuitry 108, for example, via at least one of the vehicle controller(s) 202, 204, 206.

Additionally, one or more of the first example vehicle controller 202, the example cloud computing platform 138, the example server 140, the example IDS 104, the example NAD 106, the example alert dispatcher 122, the example vehicle interface 502, the example alert generator 504, the example database 506, and/or, more generally, the example alert control system 500 of FIG. 5 may be implemented by hardware, software, firmware and/or any combination thereof. For example, one or more (e.g., all) of the first example vehicle controller 202, the example cloud computing platform 138, the example server 140, the example IDS 104, the example NAD 106, the example alert dispatcher 122, the example vehicle interface 502, the example alert generator 504, the example database 506, and/or, more generally, the example alert control system 500 could be implemented by one or more circuits (e.g., an analog or digital circuit, a logic circuit, a programmable processor, etc.). Further, in some examples, at least one of the first vehicle controller 202, the cloud computing platform 138, the example server 140, the example IDS 104, the example NAD 106, the example alert dispatcher 122, the example vehicle interface 502, the example alert generator 504, the example database 506, and/or the example alert control system 500 include(s) a tangible machine-readable storage device or storage disk (e.g., a memory storing the software and/or firmware).

Figure 6:
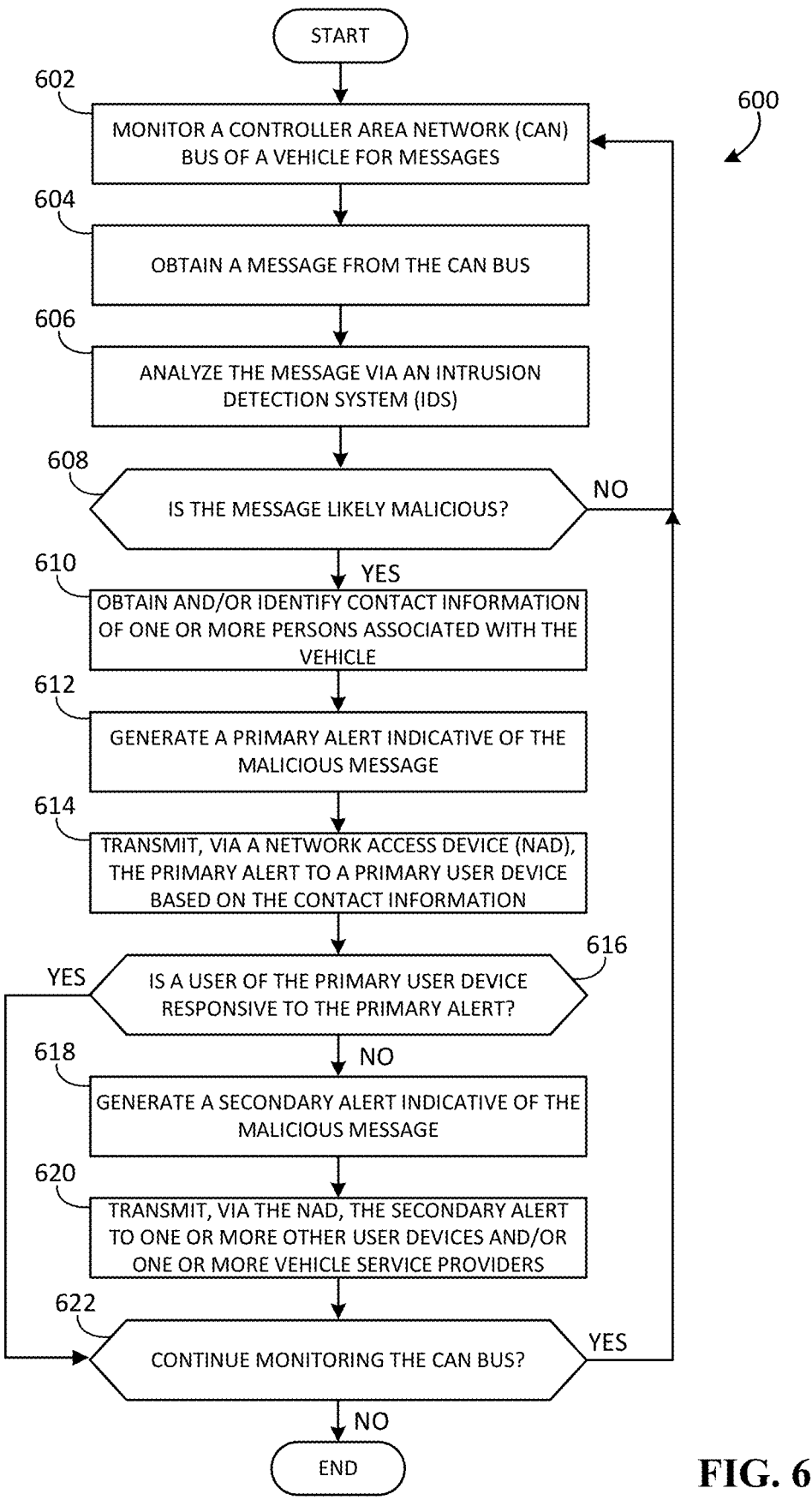
FIGS. 6 and 7 illustrate flowcharts representative of examples method that can be implemented to provide one or more user alerts when a vehicle device, a vehicle system, a vehicle, or a network thereof is compromised.
Figure 7:
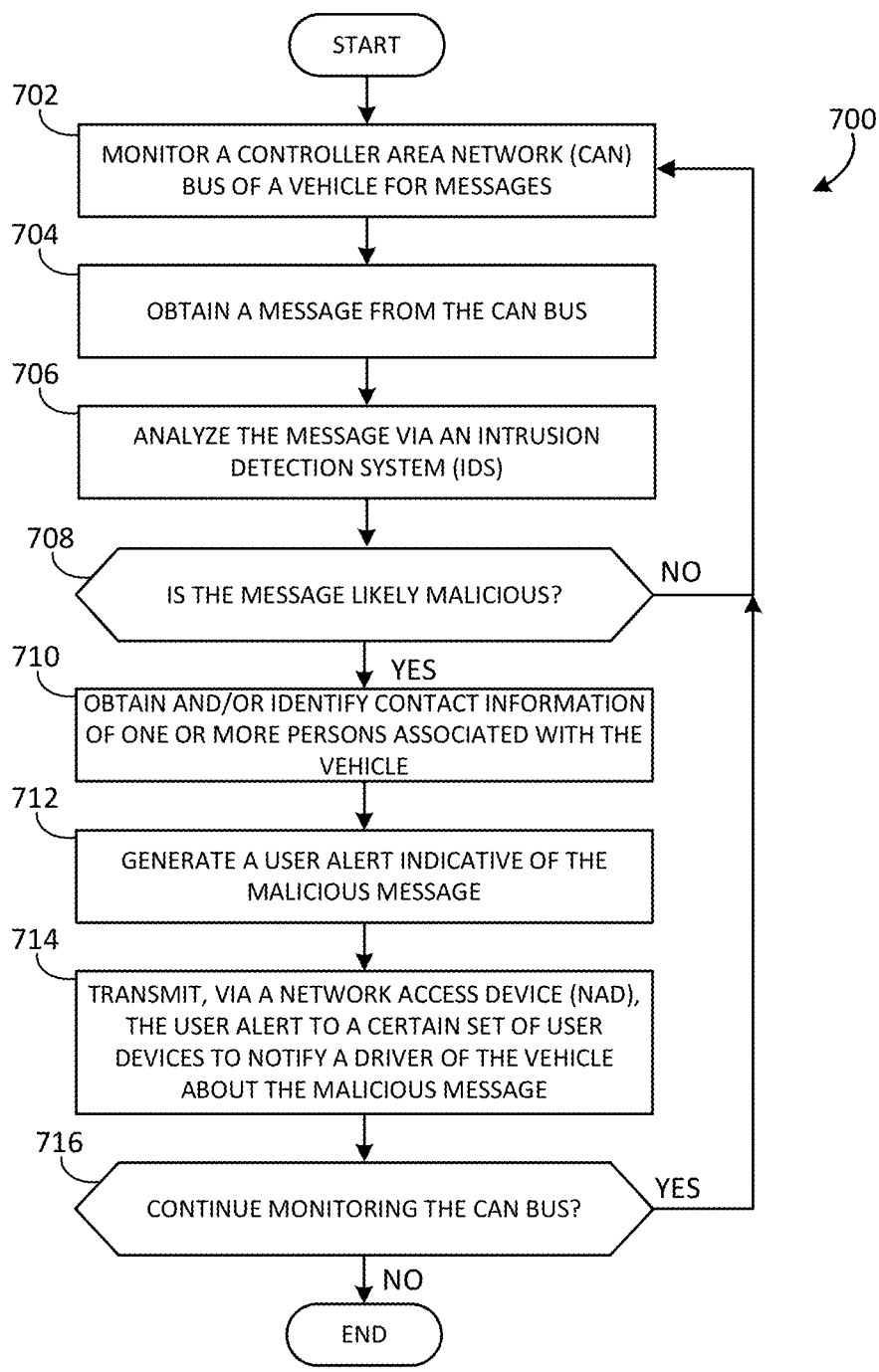

Flowcharts representative of example hardware logic or machine-readable instructions for implementing the example alert control system 500 of FIG. 5 are shown in FIGS. 6 and 7. The machine-readable instructions may be a program or portion of a program for execution by a processor such as the processor 802 shown in the example processor platform 800, which is discussed in greater detail below in connection with FIG. 8. The program may be embodied in software stored on a tangible machine-readable storage medium such as a CD-ROM, a floppy disk, a hard drive, or a memory associated with the processor 802, but the entire program and/or parts thereof could be alternatively executed by a different device and/or embodied in firmware or dedicated hardware. Further, although the example program is described with reference to the flowcharts illustrated in FIGS. 6 and 7, many other methods of implementing the example alert control system 500 may alternatively be used. For example, the order of execution of the blocks may be changed, and/or some of the blocks described may be changed, eliminated, or combined. Additionally or alternatively, any of the blocks may be implemented by one or more hardware circuits (e.g., discrete and/or integrated analog and/or digital circuitry, logic circuit, a comparator, etc.).

As mentioned above, the example processes of FIGS. 6 and 7 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and exclude propagating signals and all transmission media. Additionally or alternatively, the example process of FIGS. 6 and 7 may be implemented using coded instructions stored on a non-transitory machine-readable medium in which information is stored for any duration, which includes any type of computer or machine readable storage device or disk and excludes propagating signals and transmission media.

FIG. 6 illustrates a flowchart representative of an example method 600 that can be implemented to provide one or more user alerts when a vehicle device, a vehicle system, a vehicle, or a network thereof is compromised. The example method 600 of FIG. 6 can be implemented using any of the example system 100 of FIG. 1 or the example alert control system 500 of FIG. 5 and, in some examples, the vehicle 102, the primary user device 112, the secondary user device(s) 114, 116, and/or the vehicle service provider(s) 118.

The example method 600 of FIG. 6 begins by monitoring a CAN bus of a vehicle for messages (block 602). In some examples, the alert control system 500 of FIG. 5 monitors the bus 110 of the vehicle 102 for the observed messages 510.

The example method 600 of FIG. 6 also includes obtaining a message from the CAN bus (block 604). In some examples, the alert control system 500 of FIG. 5 obtains (e.g., via the vehicle interface 502) an observed message 510 from the bus 110.

The example method 600 of FIG. 6 also includes analyzing the message via an IDS (block 606). In some examples, the alert control system 500 of FIG. 5 analyzes the observed message 510 obtained at block 604 via the IDS 104.

The example method 600 of FIG. 6 also includes determining whether the message is likely malicious (block 608). In some examples, the alert control system 500 of FIG. 5 determines (e.g., via the IDS 104) whether the observed message 510 obtained at block 604 is likely malicious. If the alert control system 500 provides a positive determination (e.g., the observed message 510 is likely a malicious message 512) (block 608: YES), control of the example method 600 of FIG. 6 proceeds to block 610. Accordingly, in such examples at block 608, the alert control system 500 detects the malicious message 512 and/or the vehicle network event (e.g., an intrusion of a vehicle CAN bus) and, thus, also detects the condition of the vehicle 102. On the other hand, in some examples, if the alert control system 500 provides a negative determination (e.g., the observed message 510 is not likely a malicious message 512), control of the example method 600 of FIG. 6 returns to block 604.

The example method 600 of FIG. 6 also includes obtaining and/or identifying contact information of one or more persons associated with the vehicle (block 610). In some examples, the alert control system 500 of FIG. 5 obtains and/or identifies (e.g., via the vehicle interface 502, the alert generator 504, the NAD 106, and/or the alert dispatcher 122) at least some or all of the aforementioned contact information 518. For example, the alert control system 500 can obtain and/or identify (a) the primary number corresponding to the primary user device 112 and/or (b) one or more (e.g., all) of the secondary number(s) corresponding to respective one(s) of the secondary user device(s) 114, 116. As previously described, the contact information 518 enables the alert control system 500 to communicate with, via the external network(s) 120, one or more (e.g., all) of the user device(s) 112, 114, 116 shown in FIG. 1.

The example method 600 of FIG. 6 also includes generating a primary alert indicative of the malicious message (block 612). In some examples, the alert control system 500 of FIG. 5 generates (e.g., via the alert generator 504) a primary alert (i.e., one of the user alert(s) 516) indicative of the malicious message 512 detected at block 608 such as, for example, the primary alert 302 shown in FIG. 3. In some examples, the primary alert includes an instruction to the first person (e.g., the driver of the vehicle 102) to minimize potential risks to an occupant of the vehicle 102. As previously described, the alert generator 504 can encode and/or embed one or more such instructions in the primary alert.

The example method 600 of FIG. 6 also includes transmitting, via an NAD, the primary alert to a primary user device based on the contact information (block 614). In some examples, the alert control system 500 of FIG. 5 transmits, via the NAD 106, the primary alert generated at block 612 to the primary user device 112 corresponding to the first person based on the contact information 518. As previously described, the alert dispatcher 122 can receive the primary alert and the contact information 518 from the NAD 106 and transmit, via the external network(s) 120, the primary alert to the primary user device 112 using the contact information 518. Then, the primary user device 112 can present the primary alert for the first person (e.g., see FIG. 3). In some examples, the first person is the driver of the vehicle 102, as previously described.

The example method 600 of FIG. 6 also includes determining whether the user of the primary user device is responsive to the primary alert (block 616). In some examples, the alert control system 500 determines (e.g., via the alert dispatcher 122) whether the first person (i.e., the user of the primary user device 112) is response to the primary alert transmitted at block 614. If the alert control system 500 provides a positive determination (e.g., the alert dispatcher 122 detects an activation of the confirm button 312 within the time interval) (block 616: YES), control of the example method 600 of FIG. 6 proceeds to the block 622. On the other hand, in some examples, if the alert control system 500 provides a negative determination (e.g., the alert dispatcher 122 does not detect an activation of the confirm button 312 within the time interval) (block 616: NO), control of the example method 600 of FIG. 6 proceeds to block 618.

The example method 600 of FIG. 6 also includes generating a secondary alert indicative of the malicious message (block 618). In some examples, the alert control system 500 of FIG. 5 generates (e.g., via the alert generator 504) a secondary alert (i.e., one of the user alert(s) 516) indicative of the malicious message 512 detected at block 608 such as, for example, the secondary alert 402 shown in FIG. 4. In some examples, the secondary alert includes an instruction to the user(s) of the secondary user device(s) 114, 116 to (a) contact the first person regarding the malicious message 512 detected by the alert control system 500 and/or (b) instruct the first person to reduce potential risks to a vehicle occupant.

The example method 600 of FIG. 6 also includes transmitting, via the NAD, the secondary alert to one or more other user devices and/or one or more vehicle service providers (block 620). In some examples, the alert control system 500 of FIG. 5 transmits, via the NAD 106, the secondary alert generated at block 618 to one or more (e.g., all) of the secondary user device(s) 114, 116 and/or the vehicle service provider(s) 118 based on the contact information 518. As previously described, the secondary user device(s) 114, 116 include (a) the second user device(s) 114 that correspond to the different person(s) (e.g., family of the first person, one or more friends of the first person, etc.) and (b) the third user device(s) 116 that correspond to the owner(s), the employee(s), and/or the personnel of the vehicle service provider(s) 118. In such examples, the alert dispatcher 122 can receive the secondary alert and the contact information 518 from the NAD 106 and transmit, via the external network(s) 120, the secondary alert to the secondary user device(s) 114, 116 using the contact information 518. Then, the secondary user device(s) 114, 116 can present the secondary alert for user(s) of the secondary device(s) 114, 116 (e.g., see FIG. 4), which urges the user(s) of the secondary user device(s) 114, 116 to take appropriate action.

The example method 600 of FIG. 6 also includes determining whether to continue monitoring the CAN bus (block 622). In some examples, the alert control system 500 of FIG. 5 determines whether to continue monitoring the bus 110 of the vehicle 102. If the alert control system 500 provides a positive determination (block 622: YES), control of the example method 600 of FIG. 6 returns to block 602. On the other hand, in some examples, if the alert control system 500 provides a negative determination (block 622: NO), the example method 600 of FIG. 6 ends.

Although the example method 600 is described in connection with the flowchart of FIG. 6, one or more other methods of implementing the example alert control system 500 may alternatively be used. For example, the order of execution of the blocks 602, 604, 606, 608, 610, 612, 614, 616, 618, 620, 622 may be changed, and/or at least some operations of the blocks 602, 604, 606, 608, 610, 612, 614, 616, 618, 620, 622 described may be changed, eliminated, or combined. For example, the operations of blocks 602, 604, 606, 608, 610, 612, 614 can be repeated and executed independent of and/or simultaneously with the operations of the blocks 618, 620, 622. Further, in some examples, the operation of block 616 is eliminated, the operations of blocks 612 and 618 are combined and/or executed simultaneously, and the operations of blocks 614 and 620 are combined and/or executed simultaneously.

FIG. 7 illustrates a flowchart representative of an example method 700 that can be implemented to provide one or more user alerts when a vehicle device, a vehicle system, a vehicle, or a network thereof is compromised. The example method 700 of FIG. 7 can be implemented using any of the example system 100 of FIG. 1 or the example alert control system 500 of FIG. 5 and, in some examples, the vehicle 102, the primary user device 112, the secondary user device(s) 114, 116, and/or the vehicle service provider(s) 118.

The example method 700 of FIG. 7 begins by monitoring a CAN bus of a vehicle for messages (block 702). In some examples, the alert control system 500 of FIG. 5 monitors the bus 110 of the vehicle 102 for the observed messages 510.

The example method 700 of FIG. 7 also includes obtaining a message from the CAN bus (block 704). In some examples, the alert control system 500 of FIG. 5 obtains (e.g., via the vehicle interface 502) an observed message 510 from the bus 110.

The example method 700 of FIG. 7 also includes analyzing the message via an IDS (block 706). In some examples, the alert control system 500 of FIG. 5 analyzes the observed message 510 obtained at block 704 via the IDS 104.

The example method 700 of FIG. 7 also includes determining whether the message is likely malicious (block 708). In some examples, the alert control system 500 of FIG. 5 determines (e.g., via the IDS 104) whether the observed message 510 obtained at block 704 is likely malicious. If the alert control system 500 provides a positive determination (e.g., the observed message 510 is likely a malicious message 512) (block 708: YES), control of the example method 700 of FIG. 7 proceeds to block 710. Accordingly, in such examples at block 708, the alert control system 500 detects the malicious message 512 and/or the vehicle network event and, thus, also detects the condition of the vehicle 102. On the other hand, in some examples, if the alert control system 500 provides a negative determination (e.g., the observed message 510 is not likely a malicious message 512), control of the example method 700 of FIG. 7 returns to block 704.

The example method 700 of FIG. 7 also includes obtaining and/or identifying contact information of one or more persons associated with the vehicle (block 710). In some examples, the alert control system 500 of FIG. 5 obtains and/or identifies (e.g., via the vehicle interface 502, the alert generator 504, the NAD 106, and/or the alert dispatcher 122) at least some or all of the aforementioned contact information 518. For example, the alert control system 500 can obtain and/or identify (a) the primary number corresponding to the primary user device 112 and/or (b) one or more (e.g., all) of the secondary number(s) corresponding to respective one(s) of the secondary user device(s) 114, 116. As previously described, the contact information 518 enables the alert control system 500 to communicate with, via the external network(s) 120, one or more (e.g., all) of the user device(s) 112, 114, 116 shown in FIG. 1.

The example method 700 of FIG. 7 also includes generating a user alert indicative of the malicious message (block 712). In some examples, the alert control system 500 of FIG. 5 generates (e.g., via the alert generator 504) a user alert 516 indicative of the malicious message 512 detected at block 708 such as, for example, any of the primary alert 302 shown in FIG. 3, the secondary alert 402 shown in FIG. 4, a combination of the primary and secondary alerts 302, 402, and/or a different user alert indicative of the malicious message 512 detected at block 708.

The example method 700 of FIG. 7 also includes transmitting, via an NAD, the user alert to a certain set of user devices to notify a driver of the vehicle about the malicious message (block 714). In some examples, the alert control system 500 of FIG. 5 transmits, via the NAD 106, the user alert 516 generated at block 712 to the first set of user devices 520 shown in FIG. 5 to notify the driver of the vehicle 102 about the malicious message 512 detected at block 708. As previously described, the first set of user devices 520 can include the first user device 112, one or more (e.g., all) of the second user device(s) 114, and/or one or more (e.g., all) of the third user device(s) 116. More generally, the first set of user devices 520 corresponds to the driver of the vehicle 102 and at least one person who is different from the driver and associated with the driver. Further, in some such examples, the alert control system 500 simultaneously dispatches (e.g., via the alert dispatcher 122) the user alert 516 generated at block 712 to the first set of user devices 520.

The example method 700 of FIG. 7 also includes determining whether to continue monitoring the CAN bus (block 716). In some examples, the alert control system 500 of FIG. 5 determines whether to continue monitoring the bus 110 of the vehicle 102. If the alert control system 500 provides a positive determination (block 716: YES), control of the example method 700 of FIG. 7 returns to block 702. On the other hand, in some examples, if the alert control system 500 provides a negative determination (block 716: NO), the example method 700 of FIG. 7 ends.

Although the example method 700 is described in connection with the flowchart of FIG. 7, one or more other methods of implementing the example alert control system 500 may alternatively be used. For example, the order of execution of the blocks 702, 704, 706, 708, 710, 712, 714, 716 may be changed, and/or at least some operations of the blocks 702, 704, 706, 708, 710, 712, 714, 716 described may be changed, eliminated, or combined.

Figure 8:
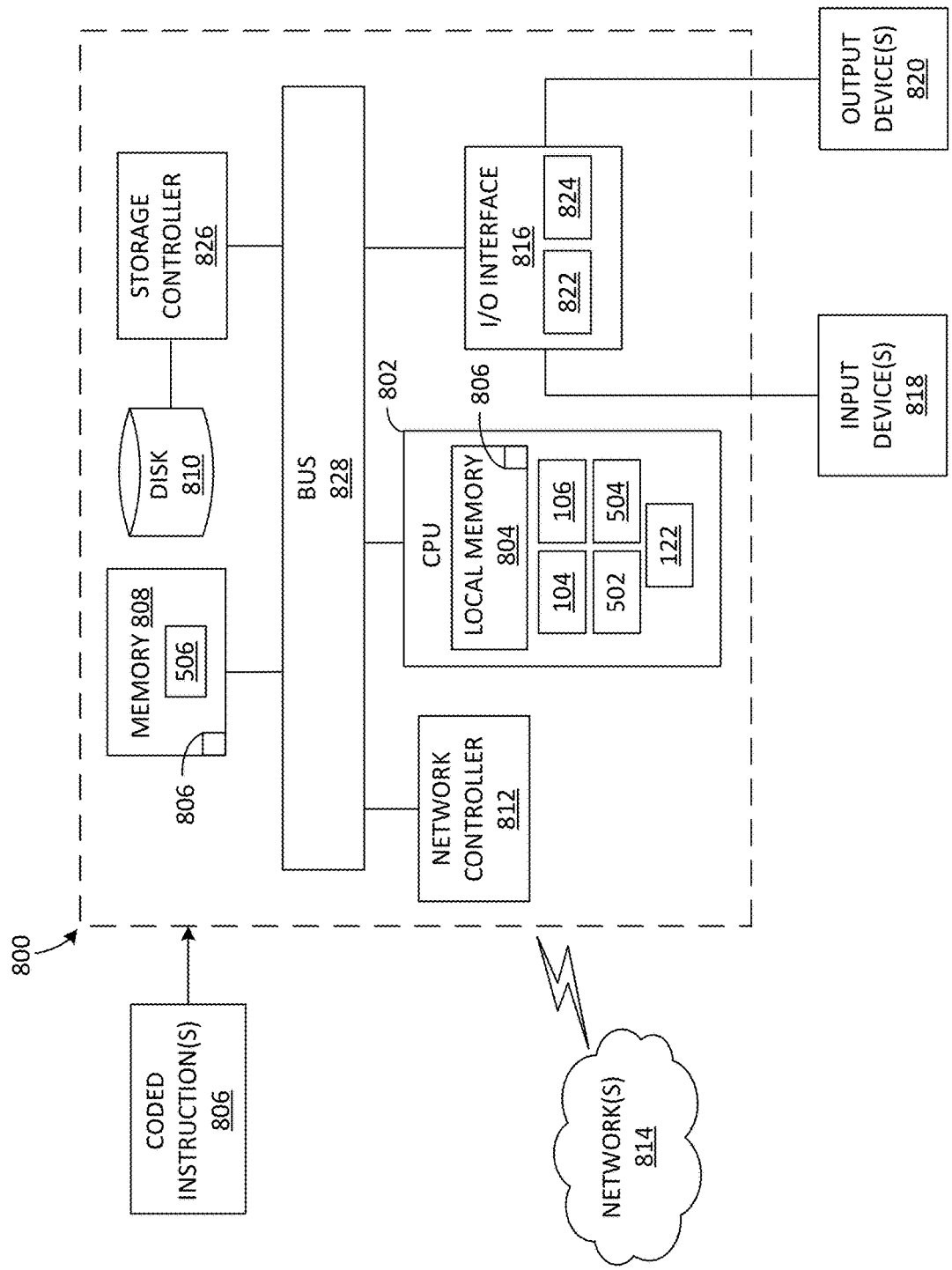
FIG. 8 is a block diagram of an example processor platform structured to execute instructions to carry out the methods of FIGS. 6 and 7 and/or, more generally, to implement the system shown in FIG. 1 and/or the alert control system shown in FIG. 5.

FIG. 8 is a block diagram of an example processor platform 800 structured to execute instructions to carry out the methods of FIGS. 6 and 7 and/or, more generally, to implement the system 100 of FIG. 1 and/or the alert control system 500 of FIG. 5. For example, the processor platform 800 can be a personal computer, a server, a mobile device (e.g., a cell phone, a smartphone, a tablet, etc.) or any other type of computing device. According to the illustrated example of FIG. 8, the processor platform 800 includes a central processing unit (CPU) 802 (sometimes referred to as a processor), which is hardware (e.g., one or more integrated circuits, logic circuits, microprocessors, etc.). The CPU 802 of FIG. 8 includes a local memory 804 such as, for example, a cache. In some examples, the CPU 802 implements the IDS 104, the NAD 106, the vehicle interface 502, and the alert generator 504, as shown in the example of FIG. 8. Additionally, in some examples, the CPU 802 can also implement the alert dispatcher 122.

Coded instruction(s) 806 to implement the methods of FIGS. 6 and 7 may be stored in a main memory 808 of the processor platform 800. The memory 808 may include a volatile memory (e.g., random access memory device(s) such as Dynamic Random Access Memory (DRAM)) and a non-volatile memory (e.g., flash memory). In the example of FIG. 8, the main memory 808 implements the example database 506. Such processes and/or instructions may also be stored on a storage medium disk 810 associated with the processor platform 800, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor platform 800 communicates, such as a server or computer for example.

Further, the claimed advancements may be provided as a utility application, background daemon, or component of an operating system, or combination thereof, executing in conjunction with the CPU 802 and an operating system such as, for example, Microsoft Windows 7, Microsoft Windows 10, UNIX, Solaris, LINUX, Apple MAC-OS or any other system(s) known to those skilled in the art.

The hardware elements in order to achieve the processor platform 800 may be realized by various circuitry elements, known to those skilled in the art. For example, the CPU 802 may be a Xenon or Core processor from Intel of America or an Opteron processor from AMD of America, or may be other processor types that would be recognized by one of ordinary skill in the art. Alternatively, the CPU 802 may be implemented on an FPGA, ASIC, PLD or using discrete logic circuits, as one of ordinary skill in the art would recognize. Further, the CPU 802 may be implemented as multiple processors cooperatively working in parallel to perform the instructions of the inventive processes described above.

In some examples, the processor platform 800 of FIG. 8 also includes a network controller 812 such as, for example, an Intel Ethernet PRO network interface card from Intel Corporation of America for interfacing with one or more networks 814. As can be appreciated, the network(s) 814 can be one or more public networks (e.g., the Internet), private networks (e.g., a LAN, a WAN, etc.) and/or sub-networks (e.g., a public switched telephone network (PSTN), an integrated services digital network (ISDN), etc.). The network(s) 814 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor platform 800 of FIG. 8 includes a general purpose I/O interface circuit 816 that interfaces and/or otherwise communicates with one or more input devices 818 and/or one or more output devices 820. The I/O interface circuit 816 of FIG. 8 may be implemented as an Ethernet interface, a universal serial bus (USB), a PCI express interface, and/or any other type of standard interface.

The input devices 818 are connected to the I/O interface circuit 816 and may include, for example, a keyboard, a mouse, a touchscreen, a button, a microphone, a voice recognition system, a camera, and/or any other suitable device(s) for enabling a user to input data and/or commands to the CPU 802.

The output device(s) 820 are also connected to the I/O interface circuit 816 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit 816 includes a display controller 822 such as, for example, a NVIDIA GeForce GTX or Quadro graphics adaptor from NVIDIA Corporation of America for interfacing with a display (e.g., a Hewlett Packard HPL2445w LCD monitor). Additionally, in some examples, the I/O interface circuit includes a sound controller 824 such as, for example, Sound Blaster X-Fi Titanium from Creative, to interface with a speaker and/or a microphone.

The processor platform 800 of FIG. 8 also includes a general purpose storage controller 826 that connects the storage medium disk 810 with a communication bus 828. The storage controller 826 may also control access to the memory 808. The communication bus 828 of FIG. 8 may be an ISA, EISA, VESA, PCI, etc. for interconnecting all of the components of the processor platform 800. For example, the CPU 802 communicates with the main memory 808 via the bus 828.

It will be appreciated that the systems, apparatus, and methods disclosed in the foregoing description provide numerous advantages. Examples disclosed herein provide an effective, low cost solution for alerting one or more persons associated with a vehicle when the vehicle, a vehicle system, or a device thereof has been compromised and/or hacked. Examples disclosed herein rapidly provide one or more advantageous user alerts in real-time to inform a driver and/or others of key threats to the vehicle as the threats are detected. Examples disclosed herein improve vehicle safety of the driver and/or one or more other vehicle occupants by ensuring the driver does not operate or continue to operate the vehicle in such an unsafe condition.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An alert system for a vehicle, comprising:
an intrusion detection system (IDS) operatively coupled to the vehicle;
a network access device (NAD) operatively coupled to the vehicle; and
control circuitry configured to:
detect, via the IDS, a malicious message transmitted through a controller area network (CAN) bus of the vehicle,
generate a primary alert indicative of the malicious message,
transmit, via the NAD, the primary alert to a primary user device corresponding to a driver of the vehicle,
generate a secondary alert indicative of the malicious message,
transmit, via the NAD, the secondary alert to one or more secondary user devices different from the primary user device,
direct, via the NAD, an alert dispatcher hosted by a server external to the vehicle to simultaneously dispatch the primary alert to the primary user device and the secondary alert to the one or more secondary user devices.

2. The alert system of claim 1, wherein the primary alert includes a notification of at least one potential risk to an occupant of the vehicle and at least one instruction on how to minimize the at least one potential risk.

3. The alert system of claim 1, wherein the primary user device includes a mobile device associated with the driver.

4. The alert system of claim 1, wherein the secondary alert includes a notification of at least one potential risk to an occupant of the vehicle and at least one instruction on how to minimize the at least one potential risk.

5. The alert system of claim 1, wherein the one or more secondary user devices include a mobile device associated with an occupant of the vehicle that is different from the driver.

6. The alert system of claim 1, wherein the one or more secondary user devices correspond to a vehicle service provider associated with the vehicle.

7. The alert system of claim 1, wherein the alert dispatcher is communicatively coupled, via one or more external networks, to the NAD, the primary user device, and the one or more secondary user devices, the alert dispatcher configured to receive the primary and secondary alerts from the NAD and dispatch the primary and secondary alerts to the primary user device and the one or more secondary user devices.

8. The alert system of claim 1, wherein the control circuitry includes one or more electronic control units of the vehicle connected to the CAN bus.

9. A vehicle, comprising:
a controller area network (CAN) bus;
an intrusion detection system UDS) connected to the CAN bus;
a network access device (NAD); and
control circuitry configured to:
detect, via the IDS, a malicious message transmitted through the CAN bus,
generate an alert indicative of the malicious message,
transmit, via the NAT), the alert to a primary user device corresponding to a first occupant of the vehicle, and,
direct, via the NAD, an alert dispatcher hosted by a server external to the vehicle to simultaneously dispatch the user alert to the primary user device and a secondary user device associated with a second occupant of the vehicle,
wherein the alert includes a notification of at least one potential risk to an occupant of the vehicle and at least one instruction on how to minimize the potential risk.

10. The vehicle of claim 9, wherein the primary user device includes a mobile device associated with the first occupant.

11. The vehicle of claim 9, wherein the alert is a primary alert, and wherein the control circuitry is configured to generate a secondary alert indicative of the malicious message and transmit, via the NAD, the secondary alert to at least the secondary user device.

12. The vehicle of claim 11, wherein the secondary alert includes a notification of the at least one potential risk to an occupant of the vehicle and at least one instruction on how to minimize the at least one potential risk.

13. The vehicle of claim 11, wherein the secondary user device includes a mobile device associated with the second occupant of the vehicle that is different from the first occupant.

14. The vehicle of claim 11, wherein the secondary user device corresponds to one or more vehicle service providers associated with the vehicle.

15. The vehicle of claim 10, wherein the control circuitry includes one or more electronic control units connected to the CAN bus.

16. A non-transitory computer-readable storage medium comprising instructions that, when executed, cause a processor to:
detect, via an intrusion detection system (IDS) of a vehicle, a malicious message transmitted through a controller area network (CAN) bus of the vehicle;
generate, via a controller of the vehicle, a user alert indicative of the malicious message;
transmit, via a network access device (NAD) of the vehicle, the user alert to a first user device associated with a driver of the vehicle and a second user device associated with an occupant of the vehicle that is parson different from the driver; and
direct, via the NAD, an alert dispatcher hosted by a server external to the vehicle to simultaneously dispatch the user alert to the first user device and the second user device.

* * * * *